(12) United States Patent
Gianoglio et al.

(10) Patent No.: US 6,389,346 B1
(45) Date of Patent: May 14, 2002

(54) SYSTEM AND A METHOD FOR CONTROLLING A SERVO-CONTROLLED MOTOR-VEHICLE GEARBOX

(75) Inventors: Renato Gianoglio; Pandeli Borodani; Giovanni Ellena; Massimo Fossanetti, all of Turin; Massimo Lupo, Rivalta; Attilio Porta, Turin, all of (IT)

(73) Assignee: C.R.F. S.C.P.A., Orbassano (IT)

( * ) Notice: Subject to any disclaimer, the term of this patent is extended or adjusted under 35 U.S.C. 154(b) by 0 days.

(21) Appl. No.: 09/214,073

(22) PCT Filed: Jun. 17, 1997

(86) PCT No.: PCT/EP97/03118

§ 371 Date: Dec. 17, 1998

§ 102(e) Date: Dec. 17, 1998

(87) PCT Pub. No.: WO97/48923

PCT Pub. Date: Dec. 24, 1997

(30) Foreign Application Priority Data

Jul. 17, 1996 (IT) .......................... TO96A0521

(51) Int. Cl.$^7$ .............................................. B60K 41/28
(52) U.S. Cl. ............................. 701/51; 701/55; 701/56; 477/78; 74/866
(58) Field of Search ................... 701/51, 52, 55, 701/56, 60; 477/78, 109, 129; 180/335, 271; 74/866

(56) References Cited

U.S. PATENT DOCUMENTS

| | | | |
|---|---|---|---|
| 3,762,837 A | 10/1973 | Ellis et al. .................. 417/360 |
| 4,806,025 A | 2/1989 | Kamiyama et al. ......... 384/202 |
| 5,113,721 A | 5/1992 | Polly ........................... 74/866 |
| 5,247,859 A | * 9/1993 | Agusa et al. ................. 74/866 |
| 5,406,483 A | 4/1995 | Kallis et al. .................. 701/55 |
| 5,436,834 A | * 7/1995 | Graf et al. .................... 701/55 |
| 5,609,545 A | * 3/1997 | Sola et al. .................... 477/78 |

FOREIGN PATENT DOCUMENTS

| | | |
|---|---|---|
| EP | 0524552 | 1/1993 |
| GB | 784937 | 10/1957 |

* cited by examiner

Primary Examiner—William A. Cuchlinski, Jr.
Assistant Examiner—Arthur D. Donnelly
(74) Attorney, Agent, or Firm—Sughrue, Mion, Zinn, Macpeak & Seas, PLLC

(57) ABSTRACT

A system for controlling a servo-controlled gearbox (C), configured so as to use gear-shifting strategies similar to those used by a human driver so as to improve the driving sensation experienced by the driver. The control system uses a plurality of sensors (SENS) disposed in the vehicle for detecting the various operative conditions and a system of rules (a rule-based system) for implementing the strategies provided for.

13 Claims, 17 Drawing Sheets

SYSTEM AND A METHOD FOR CONTROLLING A SERVO-CONTROLLED MOTOR-VEHICLE GEARBOX

The present invention relates in general to systems and methods for controlling servo-controlled and/or automatic vehicle gearboxes. More specifically, the present invention relates to a control system and a method which can reproduce and optimize She gear-shifting operations of a human driver.

The control strategies of the system have to adapt to the operative conditions of the vehicle in order to maintain the driving sensation required by the user.

In particular, the servo-controlled gearbox must react to the driver's commands correctly, even during emergency operations, during sports driving and on particularly demanding road sections such as mountain routes.

Automatic and servo-controlled gearboxes according to the prior art in fact have the disadvantage of using different strategies from those which would be adopted by a human driver. This means that the driver of a motor-vehicle having such an automatic gearbox feels uneasy when he is driving and is unsure of the reactions of the gearbox so that driving safety is reduced. The driver's psychological uneasiness may also reduce has concentration during driving.

A classical example of the problems which may be encountered with the use of conventional automatic gearboxes is the following. Faced with a descent, the driver usually lifts his foot from the accelerator in order to compensate for the effect of gravity which tends to cause the vehicle to accelerate. The automatic gearbox control often interprets this action as an intention by the driver to proceed more economically, that is, as a request for less power/acceleration, and hence engages a higher gear than the previous one. The driver thus loses the engine braking effect on which he was counting to limit the vehicle speed. He is therefore forced to brake or to force the automatic gearbox manually into a lower ratio if he does not wish to use the brakes (or if they are not to be overheated). On a stretch of mountain road, however, this means that driving becomes disagreeable since it requires the driver to override the control system of the automatic gearbox (substituting himself for it) by using it as a manual gear-shift.

U.S. Pat. No. 5,406,483 discloses a system for controlling the transmission in an off-road vehicle having an internal combustion engine and a multiple gear powershift transmission. The system comprises a microprocessor control unit, a plurality of sensors coupled to said control unit for providing signals representative of physical entities relating to the operation of the vehicle, and actuators which are driven by the control unit for controlling the operation of the gearbox. The system is adapted to implement different gearbox control strategies in dependence on the driving conditions detected. Speed selection means allow the user to select a desired vehicle ground speed and the system automatically selects the specific transmission gear and engine speed required to achieve the desired ground speed.

U.S. Pat. No. 5,113,721 discloses a system for controlling a motor vehicle drive train combining an electronic engine power control and an automatic transmission. Movements of an accelerator pedal and a brake pedal are monitored by a computer and predetermined motion sequences are selectively picked up as direct gear selection control instructions.

Other control systems for servo-assisted or robotized gearboxes are disclosed in EP-A-0,695,665 and FR-A-2,732,278.

The object of the present invention is to provide a system and a method for controlling a servo-controlled gearbox which solves all of the problems indicated above in a satisfactory manner.

According to the present invention, this object is achieved by means of a system and a method for controlling a servo-controlled gearbox having the features defined in claims 1 and 13.

Further advantages and characteristics of the present invention will become clear from the following detailed description, given with the aid of the appended drawings, provided by way of non-limiting example, in which:

FIG. 1 is a block diagram showing the principal components of a motor-vehicle propulsion system comprising a servo-controlled gearbox controlled by a system according to the present invention, FIG. 2 is a perspective view of a servo-controlled gearbox suitable for use in association with the system according to the invention, FIG. 3 is a time graph illustrating the operation of the system according to the invention, FIGS. 4 to 7 are block diagrams illustrating the operating principles of the system according to the invention, FIG. 8 is a Cartesian graph illustrating the operating principle of the system according to the invention, and FIGS. 9 to 17 are time graphs plotted, illustrating the operation of the system according to the invention.

For a better understanding, FIG. 1 shows a motor-vehicle propulsion system comprising a servo-controlled gearbox with an associated control system according to the invention. The propulsion system is conventional and comprises an internal combustion engine MT which transmits the mechanical energy developed to the driving wheels WH of the vehicle by means of a gearbox C, a transmission shaft TR and a differential DIF. As stated above, the gearbox C is a servo-controlled gearbox.

For purely illustrative purposes, FIG. 2 shows a servo-controlled gearbox C. In practice, a gearbox of this type is a conventional, mechanical gearbox C operated by means of servo-controls or actuators. FIG. 2 also shows an actuator ATFR for disengaging and engaging the clutch, an actuator ATSE for controlling the selection of the gears, and an actuator ATIN for engaging the gears. The latter two act on a single internal control rod CIM. Servo-controlled gearboxes are widely known in the art and will not therefore be detailed further.

These servo-controlled gearboxes can thus perform all of the operations necessary for a gear shift (clutch disengagement/engagement, gear disengagement/selection/engagement) without intervention by the driver. Naturally, however, a control unit, typically an electronic control unit ECU controlling the actuators ATFR, ATSE, ATIN, is required. There are two different possible control modes for a servo-controlled gearbox. In a first, semi-automatic mode, the gearbox C operates upon the driver's command, that is, it executes a gear shift only when required to by the driver. In this case, the control strategies are concerned solely with controlling the various operations relating to the gear shift. In a second mode, the gearbox operates like an automatic gearbox. In this case, the control strategies are more complex and also decide how and when to execute gear shifts, whilst the driver no longer communicates any commands to the gearbox C.

Thus, with reference again to FIG. 1, this shows the electronic control unit ECU which constitutes the heart of the control system according to the present invention. Naturally, the control unit ECU is connected to the actuators, generally indicated AT, of the servo-controlled gearbox C. It is also connected to a plurality of sensors, generally indicated SENS, which are disposed in the vehicle and by means of which the control unit acquires the data necessary to control the servo-controlled gearbox C. The sensors SENS will be described in greater detail below. The control unit is also connected to a control or gear-selection lever LC of the gearbox, by means of which the driver can send commands to the electronic control unit ECU. There are in fact some decisions which can be taken only by the driver, such as, for example: selecting neutral or engaging reverse gear. In the case of the semi-automatic method, the driver also uses the control lever LC to communicate to the control unit ECU how and when to execute gear shifts.

Operating Principle

Requests for a gear shift may come from the driver by means of the control lever LC, also known as the UP/DOWN selector since it permits shifting "up" or "down" by one gear, or may be determined by the automatic gear-shifting strategic (which can be activated by means of a suitable push-button).

As stated, the system uses hydraulic actuators AT for operating the clutch and for selecting and engaging the gear and can also regulate the opening of the engine throttle valve, that is, it can control the power delivered by the internal combustion engine MT, by means of an electric actuator. The internal combustion engine MT therefore has a motorized throttle valve DBW. This configuration is known by the name "drive-by-wire" since the connection between the throttle valve and the accelerator pedal PA is not mechanical but electronic.

The gear-shifting operation can be divided into the following steps:
  reduction of engine torque and disengagement of the clutch,
  disengagement of the previous gear, selection and engagement of the new gear, adjustment of engine revolutions,
  re-engagement of the clutch and gradual re-establishment of drive at the level required by the driver.

The system is also configured to control automatic driving away (starting from a standstill) in accordance with the performance level set by the driver by means of the accelerator pedal.

In a currently-preferred embodiment, the system according to the invention is constituted by the following components:

Integrated Gear-Shifting and Clutch Unit

This performs the functions of the disengagement, selection and engagement of the gear and control of the clutch actuator by means of three hydraulic actuators driven by solenoid valves, that is, the actuators ATFR, ATSE and ATIN visible in FIG. 2.

The engagement actuator ATIN is of the double-acting type and enables three mechanically-determined positions corresponding to even gears, odd gears and neutral gear to be reached. This actuator ATIN is controlled by means of two solenoid valves.

The selection of the forked rod to be operated takes place by means of the selection piston ATSE which moves the gear rod of the gearbox C. The selection actuator ATSE, like the engagement actuator ATIN, is of the double-acting type and reaches three mechanically-defined positions corresponding to three gear selection positions (1st–2nd, 3rd–4th, 5th–reverse). Control takes place in this case by means of two on-off solenoid valves.

The clutch is operated by a single-acting piston actuator ATFR controlled by a solenoid valve.

The integrated unit also comprises a hydraulic accumulator with a diaphragm and a pressure transducer connected to the electronic control unit ECU.

Motorized Throttle Valve DBW

This device enables the position of the motorized throttle valve DBW to be set by means of a remote control to permit integrated control of the engine MT and of the gearbox C during gear-shifting. It is constituted by an electric actuator controlled by the electronic control unit ECU. The position of the throttle valve FAR is measured by means of a suitable sensor connected to the control unit ECU.

Electric Pump Unit

This supplies the hydraulic energy necessary for the actuations performed by the gearbox servo-control.

It comprises an electric pump which can be activated by means of a relay piloted by the control unit ECU, a non-return valve, the pressure-relief valve, an intake filter, and the oil reservoir.

Driver Commands

The driver communicates with the system by means of the following commands which are acquired by the control unit ECU:

Accelerator Pedal PA.

The pedal position PACC is detected by a potentiometric sensor SENS integrated with a travel start switch (idling). During gear shifting, the motorized throttle valve DBW is controlled solely by the commands coming from the electronic control unit ECU.

Brake Pedal PF.

The depressed condition of the brake pedal PF is detected by means of the switch SW-FRE which controls the brake lights of the vehicle.

UP/DOWN Gear Selection Lever LC.

This allows the driver to request a shift to a higher gear, UP, (lever LC pushed forwards), or to a lower gear, DOWN, (lever LC pushed backwards), to select drive from neutral, to engage drive and to cause the gearbox to be put in neutral.

Operative Mode Selector.

The change from semi-automatic operation (gear shift requested by the driver by means of the UP/DOWN control lever LC) to automatic shifting mode takes place by the operation of a suitable push-button. Each time the driver pushes the push-button, the system changes from one operating mode to the other.

Vehicle Key.

Allows the entire servo-control system to be activated and de-activated and the engine to be started.

On-board Information System

An alphanumeric display indicates the gear engaged and the operating mode set (automatic or semi-automatic).

A sound indicator indicates to the driver the occurrence of anomalous operating conditions such as movement of the vehicle in the opposite direction to that corresponding to the gear engaged, or overheating of the clutch plate.

Electronic Control Unit ECU

During tests carried out by the Applicant, the cycle time Tc necessary to carry out all of the operations required for the control of the servo-control was about 8 ms. In the specific case, this time Tc thus represents the sampling period for the digital control system implemented in the control unit ECU.

The control unit ECU which, typically, is based on a microprocessor, receives as inputs signals of the following types, coming from the various parts of the system:

Analog Inputs.

These are converted by the microprocessor into digital quantities by means of analog/digital convertors.

These signals come from:

sensors SENS connected to the clutch, selection and engagement actuators ATFR, ATSE and ATIN, potentiometers SENS which measure the position PACC of the accelerator pedal PA, of the throttle valve FAR, of the lever LC, and of the steering wheel VOL, a sensor SENS which measures the line pressure of the hydraulic circuit, an accelerometer SENS which detects the longitudinal acceleration Ax of the vehicle, a sensor SENS for detecting the vacuum in the intake manifold, sensors SENS for measuring the temperature of the servo-control oil and of the air in the vicinity of the clutch pressure plate.

Digital Inputs.

These may adopt logic values 0 and 1.

They come from:

the vehicle key, push-buttons for requesting neutral and reverse gear, push-button for selecting mode of operation, brake-light switch SW-FRE, minimum switch of the accelerator pedal PA.

Frequency Digital Inputs.

These are the output signals of the sensors SENS used to measure the speed of rotation of the engine shaft and of the primary and secondary shafts of the gearbox C. These quantities will be defined below for simplicity of notation as engine revolutions GMCT, gearbox input revolutions GING, and gearbox output revolutions GUSC. The value of GUSC is proportional to the speed V of the vehicle and is therefore used to derive this latter datum.

The control unit ECU processes the data received from the sensors SENS and, on the basis of the control strategies set, sends control signals to all of the actuator devices AT connected thereto. These output signals can be divided into:

Analog Outputs.

These are constituted by:

proportional current controls for the engagement solenoid valves ATIN and for the clutch solenoid valve ATFR, position reference, constituted by a direct-current voltage, for the actuator of the motorized throttle valve DBW, actual throttle-valve position FAR for supply as an input to the engine control unit (voltage output).

Digital Outputs.

These are signals which can only have the values 0 (zero voltage or current) and 1 (maximum voltage or current). They are used for:

current on-off controls for the selection solenoid valves ATSE, relay activation enabling starting of the engine MT, electric pump control, reversing light control, display and sound-indicator control.

Before being processed by the control system, all of the input signals are subjected to filtering and validation operations in order to reduce the effects of noise and of measurement instabilities and to recognize any breakdowns of sensors SENS or actuators AT.

The electronic circuitry of the system comprises a series of low-pass filters which are used to attenuate the noise contribution and eliminate interference present in the signals.

Digital filters and assessment algorithms which can validate the signals and make up for some breakdowns of the sensors SENS (for example, damage to the accelerator potentiometer PA or to another sensor SENS) are also implemented in the programming of the electronic control unit ECU.

As well as the quantities measured directly by the sensors SENS, there are others which have to he determined indirectly by simple numerical differentiation and integration or by mathematical models. The principal variables estimated are the following:

angular accelerations of the engine shaft and of the input and output shafts of the gearbox C (calculated as differentials of the corresponding angular velocity signals measured), differential of the position PACC of the accelerator pedal (necessary for correct recognition of the driver's intentions), the torque CMOT delivered by the engine MT (calculated from the signals relating to the position of the throttle-valve FAR and to the engine revolutions GMOT, by means of tables derived from test measurements).

Control Strategies of the System

The control program of the system which is implemented in the control unit ECU can recognize the principal operating conditions of the vehicle on the basis of the signals coming from all of the sensors and the values of the quantities estimated.

The principal operating conditions provided for are:

activation of the system, vehicle in the driving-away stage, request by the driver for a gear shift, execution of the gear shift, disengagement of the clutch during braking, automatic shifting mode.

These control strategies are described in greater detail in the following paragraphs.

Activation of the System

Activation takes place by the positioning of the vehicle key in the on position. It should be noted that this position does not coincide with the engine-starting position.

With the engine off and the key at on, the control unit ECU is fully operative, acquires all of the inputs, and controls the commands to the actuators AT. The control unit ECU is de-activated only when the vehicle key is brought to the off position (in this case, actuations still in progress are in any case completed).

It is possible, with the use of the gear selection lever LC with the engine MT off:

to check the selection of all of the gears or to engage the desired parking gear, to start the engine MT.

For safety reasons, the normal procedure for starting the engine MT (upon command by the vehicle key) is enabled only if the gearbox C is in neutral (if not, the system waits for the driver to select the neutral position by means of the control lever LC).

Vehicle in the Driving-Away Stage

When the vehicle is stationary with the engine MT running (gearbox output revolutions GUSC zero) and 1st gear engaged, the clutch is kept disengaged waiting for the driver to depress the accelerator pedal PA to request the vehicle to start moving.

The operation of the accelerator pedal PA activates the driving-away procedure during which the clutch actuator ATFR modulates the driving torque CFRI transmitted to the driving wheels WH and allows the vehicle to pick up speed.

The torque modulation CFRI varies according to the position of the accelerator pedal PA and the engine revolutions GMOT measured.

The vehicle can drive away only in 1st and in reverse. When the vehicle is stationary and a driving-away gear is not engaged, the system automatically engages 1st.

When the engine revolutions GMOT and the gearbox input revolutions GING become equal (synchronism condition), the clutch is fully engaged and the operation is considered completed.

Request for a Gear Shift by means of the UP/DOWN Lever LC

In semi-automatic mode, the driver requests the engagement of the gears by means of the UP/DOWN lever LC.

The system has to recognize correctly the UP, DOWN, neutral and reverse commands and the rest position of the lever LC. It is also necessary to check that the command can actually be accepted.

In the rest condition, the gear selection lever LC is in a stable, central position. A position sensor, the output signal of which is acquired by the control unit ECU can detect the movements of the lever LC. There are two push-buttons on the grip of the lever LC: a first push-button, combined with the DOWN request, enables reverse gear to be requested, and a second push-button enables the gearbox to be put in neutral.

The system operates the following commands:

Shifting Up (UP)

A request for a higher gear (shifting up) is recognized when the lever LC, having started from the central position, passes beyond the UP position (movement forwards beyond a predetermined threshold).

On the basis of this command, the procedure for shifting to the higher gear is started only if the new gear will not bring the engine MT to too low a rate of revolution GMOT, which would compromise the drivability of the vehicle.

When the engine MT is not running, shifting UP is always enabled.

Shifting Down (DOWN)

A requested to shift to a lower gear (shifting down) is recognized when the lever LC, having started from the central position, passes beyond the DOWN position (rearward movement beyond a predetermined threshold).

The gear shift is executed if the new ratio does not impose a rate of revolution GMOT greater than the maximum engine speed limit (for example 6500 rpm).

To limit wear of the synchronizing gears, it is possible to set lower maximum engine speed thresholds for the more critical gear shifts (2nd–1st and 3rd–2nd).

Engagement of Reverse Gear

When the lever LC is in the DOWN position and the first push-button is pressed, the system detects a request for the engagement of reverse gear. The operation is carried out only if the vehicle is stationary.

Putting the Gearbox in Neutral

This is commanded by the driver by pressing the second push-button on the lever LC. This request takes priority over any other and is accepted only if the vehicle speed is below a predefined threshold. This check is carried out for safety reasons to prevent incorrect manoeuvres by the driver.

Execution of the Gear Shift

When the system recognizes and accepts a request for a gear shift, the procedure for implementing the command starts. The operation as a whole is constituted by three quite distinct successive steps.

Reduction of the Driving Torque and Disengagement of the Clutch

Before starting the disengagement of the gear and the subsequent engagement of the new gear, it is necessary to disconnect the gearbox C from the drive shaft by disengaging the clutch. Moreover, it is necessary to reduce the driving torque CMOT progressively until it is zero approximately at the moment when the clutch is disengaged. The torque CMOT is reduced by adjustment of the opening of the motorized throttle valve DBW by means of the control signal which the control unit ECU sends to the electric actuator of the motorized throttle valve DBW. The disengagement of the clutch and the reduction of the torque CMOT effected by the control of the throttle valve DBW are visible in FIG. 3.

The reduction of the torque CFRI transmitted by the clutch and of the engine torque CMOT takes place by means of a linear law.

Loss of drive occurs when the clutch which is being disengaged reaches the point of incipient slipping.

Disengagement of the Gear

In this step, the clutch is kept disengaged and the solenoid valves of the engagement actuator ATIN are controlled so as to disengage the gear which is still engaged and to return the gearbox C to neutral.

Selection and Engagement of the New Gear

When the gearbox C is in the neutral position, current is supplied to the on-off solenoid valves which move the selection actuator ATSE to the location corresponding to the position for the selection of the new gear.

At this point, if a lower gear (DOWN) has been requested, the motorized throttle valve DBW is controlled so as to supply to the engine MT the torque CMOT necessary to bring the engine revolutions GMOT to a value close to that to be reached upon completion of the shift. This adjustment of revolutions is very important, particularly when the accelerator pedal PA is released, since it reduces the time taken to shift gear.

The subsequent engagement of the gear takes place by the operation once more of the solenoid valves of the engagement actuator ATIN so as to bring it to the position corresponding to the new gear.

The current controlling the solenoid valves is regulated so as to set the optimal engagement force which can engage the new ratio safely without applying an excessive load which could damage the synchronizing gears.

In performance gear-shifting, the load is increased by 30% in comparison with the optimal value.

The correct setting of the engagement force enables the system to safeguard the integrity of the synchronizing gears even in the most critical conditions and lengthens the life of these components.

Re-establishment of Drive

Upon completion of the synchronizing stage and after effective engagement of the new gear has been checked, the procedure for re-establishing drive, during which the engine torque CMOT is brought back to the value corresponding to the position PACC of the accelerator pedal PA set by the driver, is started. The control unit ECU also controls the motorized throttle valve DBW by means of a signal which increases linearly with time in this case.

At the same time, the torque CFRI transmitted by the clutch is modulated in order to bring the acceleration level of the vehicle gradually back to a value consistent with the driver's requirements.

When the engine revolutions GMOT and the gearbox input shaft revolutions GING are synchronized, the clutch is fully engaged.

FIG. 3 shows the sequence in time of the various steps described above.

As can be seen, FIG. 3 shows the curve of the engine revolutions GMOT and of the gearbox input revolutions GING, as well as of the engine torque CMOT and of the torque CFRI transmitted by the clutch during the various stages of a gear shift executed within an interval Tshift. During the first stage Tu which lasts from the time t0 to the time t1, the engine torque CMOT is reduced, the clutch is disengaged and, in the final portion, the previous gear is disengaged. In a second stage Tm which lasts from the time t1 to the time t2, the new gear is selected. In the third stage Ti which lasts from the time t2 to the time t3, the new gear is engaged, in the time interval Tsinc, the gears are synchronized and the clutch is then re-engaged. The engine torque CMOT and hence also the torque CFRI transmitted by the clutch, are simultaneously increased, thus re-establishing drive.

The control parameters always vary in dependence on the performance level, seeking an acceptable compromise between comfort and speed of the operation.

A very important parameter for analysing the behaviour of the system during gear shifting is the time during which drive is lost.

This time measures the duration of the stage during which the torque CFRI transmitted by the clutch is zero and the longitudinal acceleration Ax of the vehicle is therefore zero.

The times which can be achieved are from 250 ms (performance shift) to about 350 ms (comfort shift).

Disengaging Clutch During Braking

When the engine revolutions GMOT tend to fall rapidly below idling speed (for example about 850 rpm) the clutch is disengaged to prevent the engine MT from stalling. The disengagement is advanced to a higher threshold of the engine revolutions GMOT (for example, up to 1100 rpm) when the deceleration of the vehicle is very rapid, as in the case of abrupt braking. The rapid decrease in engine revolutions GMOT caused by the braking torque is thus balanced.

The clutch is then slowly re-engaged when the vehicle picks up speed again, for example, when going downhill. If, on the other hand, the driver presses the accelerator PA, modulated re-engagement of the clutch is carried out in order to re-establish drive.

Test Results

Tests carried out by the Applicant enabled the correct operation of the system to be checked. A series of comparative tests was carried out in order to compare the average times for which drive is lost, detected in a normal production manual gearbox, with those which can be achieved with the use of the gearbox according to the invention.

The results obtained show that, on average, the times detected for a manual gearbox are about double those obtained with a prototype formed in accordance with the present invention.

A problem to be solved for the implementation of a correct gear-shifting strategy in automatic mode is that of recognizing the operative situation to be implemented by the processing of the data coming from the sensors SENS mounted in the vehicle.

The procedures implemented in the system according to the present invention enable the following quantities to be estimated:

lateral acceleration Ay (enabling the system to recognize situations in which the lack of driving torque due to the dis-engagement of the clutch during gear shifting could alter the stability of the vehicle on bends), slope of the road, deceleration of the vehicle during braking.

The methods used to estimate these quantities are described briefly below.

Assessment of Lateral Acceleration

When the vehicle is driving round a bend, the lateral forces generated as a result of the contact between the tyres and the ground equal the centrifugal force, enabling the path set by the driver by means of the steering wheel VOL to be maintained.

In static conditions, there is a well-defined relationship between the lateral acceleration Ay, the steering-wheel angle AVOL set, and the vehicle speed V.

The set of data necessary to carrot out this assessment is the following:

steering-wheel angle AVOL, measured by means of a rotary potentiometric sensor SENS mounted on the steering column, vehicle speed V, which can be derived from the average of the speeds of rotation of the non-driving wheels WHN measured by means of phonic wheels, or from the gearbox output revolutions GUSC, parameters characteristic of the vehicle: wheelbase L, mass $M_a$ concentrated on the front axle, mass $M_p$ concentrated on the rear axle, cornering stiffness $C_a$ of the front tyres, cornering stiffness $C_p$ of the rear tyres, steering ratio $\tau$.

The equation which enables the lateral acceleration value to be determined is the following:

$$Ay=(AVOL/\tau)/(M_a/C_a-M_p/C_p)+L/V^2 \quad (1)$$

The accuracy of the assessment is good for values of Ay below 4 m/s² for which the linear model used to derive equation (1) is valid.

Assessment of the Road Slope

If the mass and the longitudinal acceleration of the vehicle are indicated M and Ax, the motive force transmitted to the ground by the wheels is indicated Fmot, the drag is indicated Rav and the road slope expressed in degrees is indicated α, the following equation can be used:

$$M*Ax=Fmot-Rav-M*g*\sin(\alpha) \quad (2)$$

Fmot is related in the following manner to the torque CMOT supplied by the engine MT:

$$Fmot=\eta(CMOT*\tau m-Jm*\tau m*(d\omega m/dt))/r \quad (3)$$

in which:

η=transmission efficiency

τm=ratio of the gear engaged (that is, for example about 11 for first gear and 2.85 for fifth)

Jm=moment of inertia of the engine flywheel

ωm=rate of rotation of the engine shaft r=rolling radius of the wheel.

In conditions of low adherence in which slippage (detected by comparing the speeds of rotation of the driving wheels WH and of the non-driving wheels WHN) is too high, the slope value is not updated since the mathematical model used does not supply correct data in these conditions.

Account also has to be taken of the fact that the driving torque CMOT is derived from the characteristic curves of the engine MT which supply sufficiently correct data only in static conditions. The assessment of the slope should therefore be updated only when the torque requirement by the driver is constant (fixed position PACC of the accelerator pedal PA) and no gear shifts are in progress. The updating of the slope value is also inhibited when the brake pedal PF is depressed since the vehicle does not have the sensors necessary for measuring the magnitude of the braking torque generated.

The longitudinal acceleration Ax is calculated from the vehicle speed V by numerical differentiation:

$$Ax=dV/dt \tag{4}$$

The drag depends on the speed V and is calculated by the following equation:

$$Rav=Cr+Ca*V^2 \tag{5}$$

in which Cr and Ca represent the rolling resistance and the coefficient relating to the aerodynamic characteristics of the vehicle, respectively.

Since the angle α is normally less than 30 degrees, good precision is achieved with the use of the following approximation:

$$sin(2\pi*\alpha/180)=2*\pi*\alpha/180$$

The angle α is assessed by means of an equation which is simplified in comparison with (2):

$$\alpha=(180/2\pi)*(Fmot-Rav-M*Ax)/(M*g) \tag{6}$$

The slope is positive during ascents and negative during descents. FIG. 9 gives an example of the assessment during an ascent. FIG. 9 shows the curves of the actual slope PEND-EFF and of the estimated slope PEND-STI, expressed as percentages, as functions of the distance travelled SPA.

Assessment of Deceleration During Braking

For correct control of the system in a critical situation such as braking, it is important not only to analyze the dynamic behaviour of the vehicle, but also to recognize the type of manoeuvre carried out by the driver in order to ensure a response of the servo-controlled gearbox C consistent with the driver's requirements.

It is therefore necessary to carry out a predictive assessment of deceleration to enable the control system to generate sufficiently in advance the necessary commands to achieve the vehicle response which the driver expects.

The assessment procedure is activated when the brake pedal PF is depressed (indication coming from the appropriate switch SW-FRE) and takes account of the following parameters:

longitudinal acceleration Ax, shift in the vehicle speed V relative to the initial value measured when braking started, duration of the operation.

The principal operative conditions of the vehicle during braking can be recognized on the basis of the aforementioned data. The situations which the system can distinguish are as follows:

emergency operation (large decelerations in very short times), light operation of the brake pedal PF in the vicinity of a bend, progressive braking carried out to adjust speed to road traffic requirements.

The indications provided by the assessment of deceleration are particularly important for operation in automatic mode.

Control Techniques used for the Gearbox

The control unit ECU which controls the servo-controlled gearbox C has a structure of the type which uses a reference model in which the signals for controlling the gear-engagement, gear-selection, and clutch actuators ATIN, ATSE and ATFR and the actuator for motorized throttle valve DBW are determined by a mathematical driving model which sets the behaviour of the vehicle in terms of comfort and performance during the various gear-shifting steps in dependence on the commands given by the driver. The driver interacts with the system by means of the accelerator pedal PA, the brake pedal PF and the UP/DOWN gear request lever LC.

The objective of the control system is represented by a designated profile of the longitudinal acceleration Ax of the vehicle.

The curve of the differential of Ax, that is, the shift in longitudinal acceleration (the so-called jerk) is particularly important from the point of view of travelling comfort.

The control system sets a certain acceleration profile according to the type of manoeuvre performed by the driver (which is recognized by means of the position PACC of the accelerator pedal PA and the state of the brake switch SW-FRE), and to the operative conditions of the vehicle.

For each step of the gear shift, the parameters and the mathematical relationships used by the reference model have to be modified because the structure of the system changes significantly.

The reference model determines the open loop command signals for the various actuators AT. To these signals are added the closed-loop contributions generated by an L.Q.G. (Linear—Quadratic—Gaussian) control system.

A block diagram of the structure used is given in FIG. 4.

FIGS. 10 and 11 illustrate the operation of the system in comfort-mode and performance-mode conditions. Each of FIGS. 10 and 11 comprises a series of Cartesian graphs showing, as functions of time t, the curves of the engine revolutions GMOT-RIF set by the control unit ECU and of the actual revolutions GMOT, the curves of the revolutions GING-RIF at the input to the gearbox C set by the control unit ECU and of the actual revolutions GING, the curves of the clutch torque CFRI and of the position FAR of the motorized throttle valve DBW, expressed as percentages, and the curve of the longitudinal acceleration Ax, expressed in g.

In particular, FIG. 10 shows a gear shift from 1st–2nd carried out in comfort mode whereas FIG. 11 shows the same gear shift carried out in sports mode.

Control Strategy for Automatic Gear Shift

The gearbox C can operate in a fully-automatic mode which can be selected by the user by means of a suitable push-button. In these operating conditions, no operation by the driver on the gear-selection lever LC is required. (Naturally, the neutral and reverse controls and the engagement of first gear with the vehicle stationary and in neutral are exceptions).

If the vehicle is not manoeuvring at low speed, every command by the gear-selection lever LC resets the normal semi-automatic mode.

The automatic control of gear shifting uses the following data coming from the interfacing between the driver and the electronic control unit ECU which controls the servo-control:

torque requirement (proportional to the position PACC of the accelerator pedal PA measured by means of the potentiometric sensor SENS), numerically-determined differential of the torque requirement, state of the brake switch SW-FRE, angle of rotation AVOL of the steering wheel VOL measured by a suitable sensor SENS (used for estimating lateral acceleration Ay).

The strategies implemented also use quantities which enable the dynamic behaviour of the vehicle and the states of the various actuators AT to be analyzed. The variables in question are:

vehicle speed V, longitudinal acceleration Ax, estimated driving torque CMOT, road slope PEND-STI calculated as described above, estimated deceleration during braking, engine revolutions GMOT clutch position.

The automatic shifting strategies use a rule-based decision method in which the data relating to the operative situation of the vehicle are compared with the driver's commands to reach the determination of the gear to be engaged.

The selection of the ratio required takes place principally by means of two steps:

calculation of the reference gear in dependence on the torque requirement and the vehicle speed V by means of a map constructed empirically by analysis of manoeuvres performed by a group of expert and non-expert drivers in semi-automatic mode and the characteristic curves of the internal combustion engine MT, checking of the consistency of the requirement calculated in the preceding step with the operative conditions of the vehicle and the type of manoeuvre in progress and possibly modification of the decision; at this level, the system can bring about a gear shift in the sense of a reduction of the ratio (or DOWN) when necessary, completely independently of the maps; this occurs, for example, in the event of rapid decelerations of the vehicle.

The decision algorithm sets disablement and re-enablement of the UP gear shift and the requirements for DOWN shifting during braking as described below.

The block diagram given in FIG. 7 shows the structure of the automatic shift controller.

The level of the longitudinal acceleration Ax at which the gear shifts take place and the duration of the transitory shift condition vary in dependence on the performance required by the driver as shown in FIGS. 12 and 13. These drawings show a series of UP gear shifts during acceleration carried out in the two modes, that is, comfort and performance modes, in exactly the same manner as FIGS. 10 and 11.

Disablement of the UP Shift

An UP request coming from the reference maps is not accepted if one of the following conditions arises:

accelerator pedal PA fully released or brake pedal PF depressed. In this case, a requirement for braking torque is recognized. Shifting up would result in a loss of the braking effect of the engine MT, a differential of the position PACC of the accelerator PA which is negative and lower than a limit threshold below which the manoeuvre is interpreted as the driver's desire to reduce the engine torque CMOT significantly (for example, in the vicinity of the entry to a bend), driving (or braking) torque of the new gear calculated unsuitable for the road slope, high lateral acceleration Ay. In these conditions, the loss of drive during the transitory shift condition could modify the path of the vehicle on a bend, creating a dangerous situation for the driver (FIG. 14 illustrates the operation of the automatic shift control system in this situation, this figure showing the steering-wheel angle AVOL, the variable ST-CURV identifying the operative condition "on a bend" in the control unit ECU, the gear MAR, as well as GMOT and GING), gear shift in progress.

The UP shift is re-enabled if the aforementioned conditions do not occur for a certain period.

The disablement of the gear shift in conditions of high lateral acceleration Ay is also active for DOWN shifting, except in situations in which maximum driving torque CMOT is required.

Control of DOWN Shifting during Braking

In braking conditions, the reference maps (which are prepared so as to ensure travelling comfort) do not enable best use to be made of the braking torque of the engine MT. In this situation, a DOWN shift is forced in order to favour deceleration of the vehicle and, in certain situations, such as the entry to a bend, to adapt the gear ratio to the characteristics of the path of the road.

The above-described deceleration assessment enables the gear shift advantageously to be advanced when the operations by the driver require it. A forced shift does not take place into first gear since it is disagreeable for the purposes of comfort and is not useful from the point of view of vehicle dynamics. Moreover, a shift into first at too high a speed V could be dangerous for the transmission. FIGS. 15 and 16, in which the state of the brake switch SW-FRE as well as Ax, MAR, GMOT, and GING can be seen, show the gear shifts during deceleration in the event of abrupt and normal braking. In the case of abrupt braking (FIG. 15), the DOWN shift takes place considerably sooner than in normal conditions (FIG. 16).

Control of Wheel-Slip

In conditions of low adherence in which slippage becomes high and the driving wheels WH slide, driving the vehicle away from a standstill and gear shifting may become critical operations and the system therefore has to be able to modify the control strategies correspondingly in these operative conditions.

If the average speeds of rotation $\omega p$ or the non-driving wheels WHN and $\omega a$ of the driving wheels are measured by means of phonic wheels, it is possible to recognize the slippage of the driving wheels WH which occurs when they transmit to the ground only some of the driving torque CMOT generated by the internal combustion engine MT, or of the torque CRFI transmitted by the clutch during driving away and in the transitory gear-shift condition.

In fact slippage never occurs in the non-driving wheels WHN and $\omega p$ therefore depends solely on the speed of advance of the vehicle, whereas $\omega a$ may become very high in comparison with $\omega p$ when the driving wheels WH are accelerated rapidly by the driving torque CFRI which is not transmitted to the ground.

In order to stop the slippage, it is necessary to reduce the driving torque CMOT until it is brought below the maximum transmissible torque value permitted by the coefficient of adherence.

The control algorithm uses the speed data $\omega p$ and $\omega a$ and the acceleration datum $\alpha p$ (differential of $\omega p$) and operates so as to re-establish normal conditions of movement of the vehicle in which:

$\alpha p = \alpha a$ $\omega p = \omega a$

The system adjusts the torque CMOT of the internal combustion engine MT by means of the motorized throttle valve DBW. FIG. 17 shows the operation of the control system in a condition in which the vehicle is driving away on a surface having a coefficient of adherence of about 0.3. The drawing shows, in addition to GMOT, GING and FAR, the rates of revolution $\omega$a of the driving wheels and $\omega$p of the non-driving wheels.

Rule-Based System

The automatic control of the gear shift is controlled by a deterministic hierarchical system of rules. A system of this type enables the programmed strategies to be implemented effectively, enabling the control unit ECU to take the correct gear-shifting decisions in the various operative conditions encountered over time.

Figure 1:
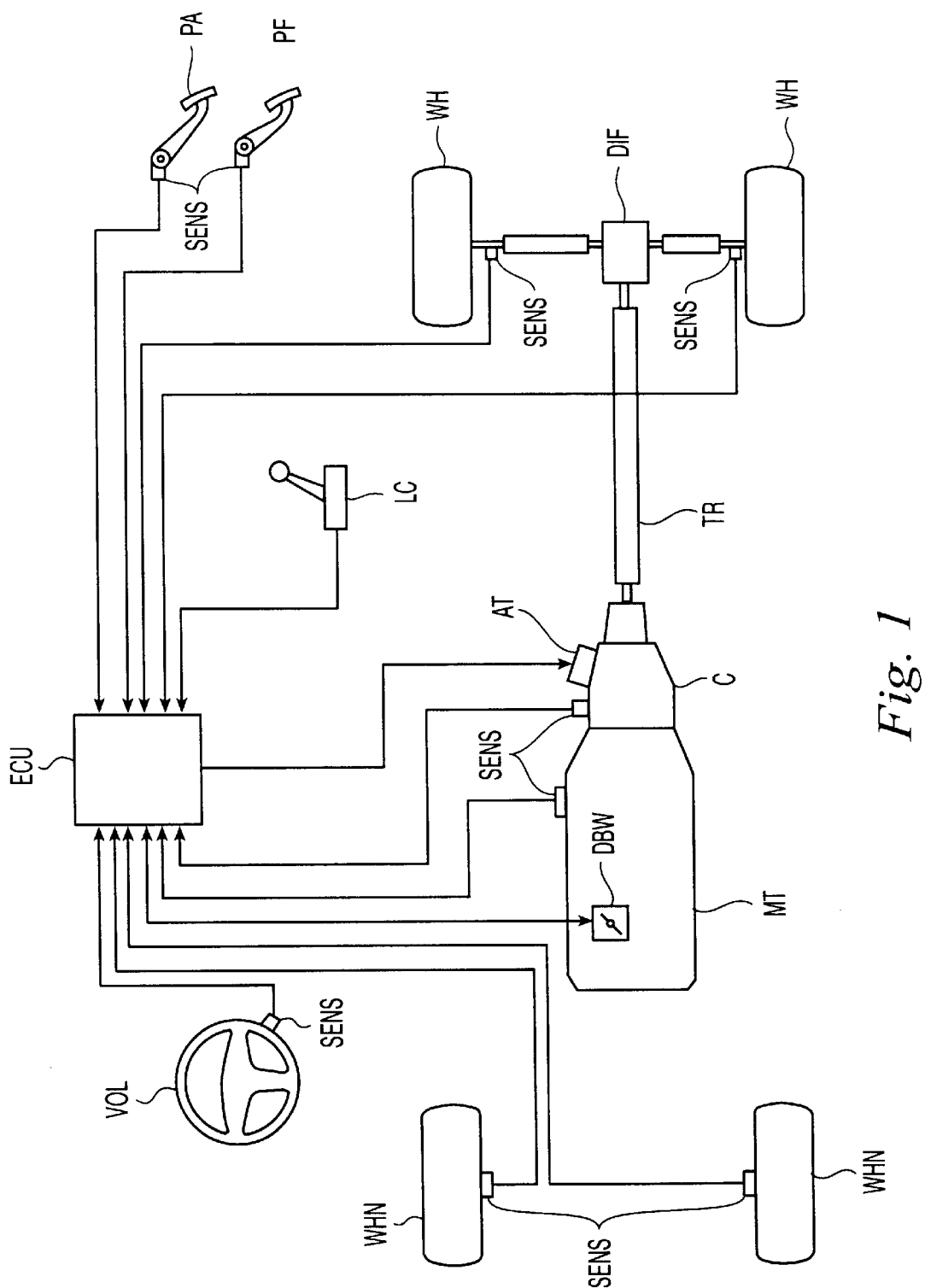
Figure 2:
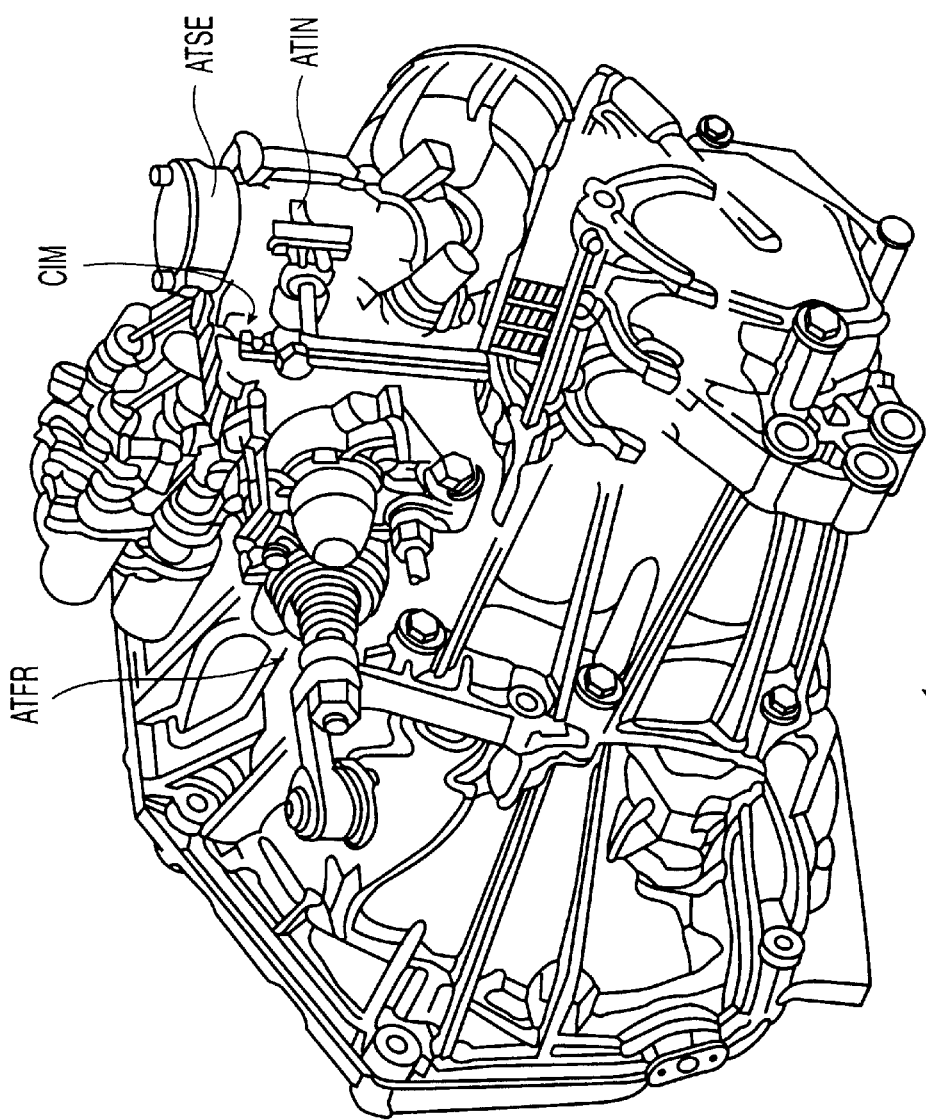
Figure 3:
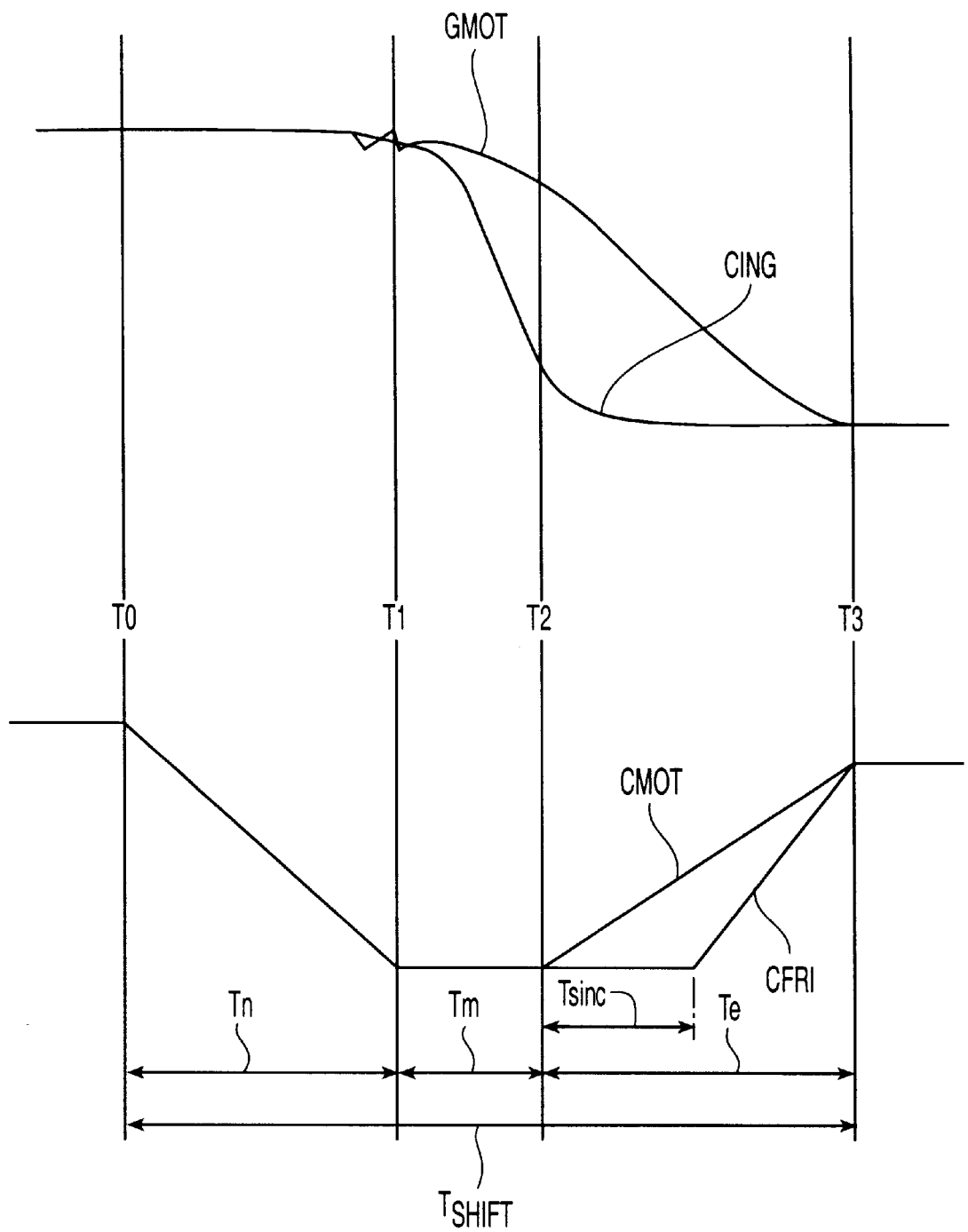
Figure 4:
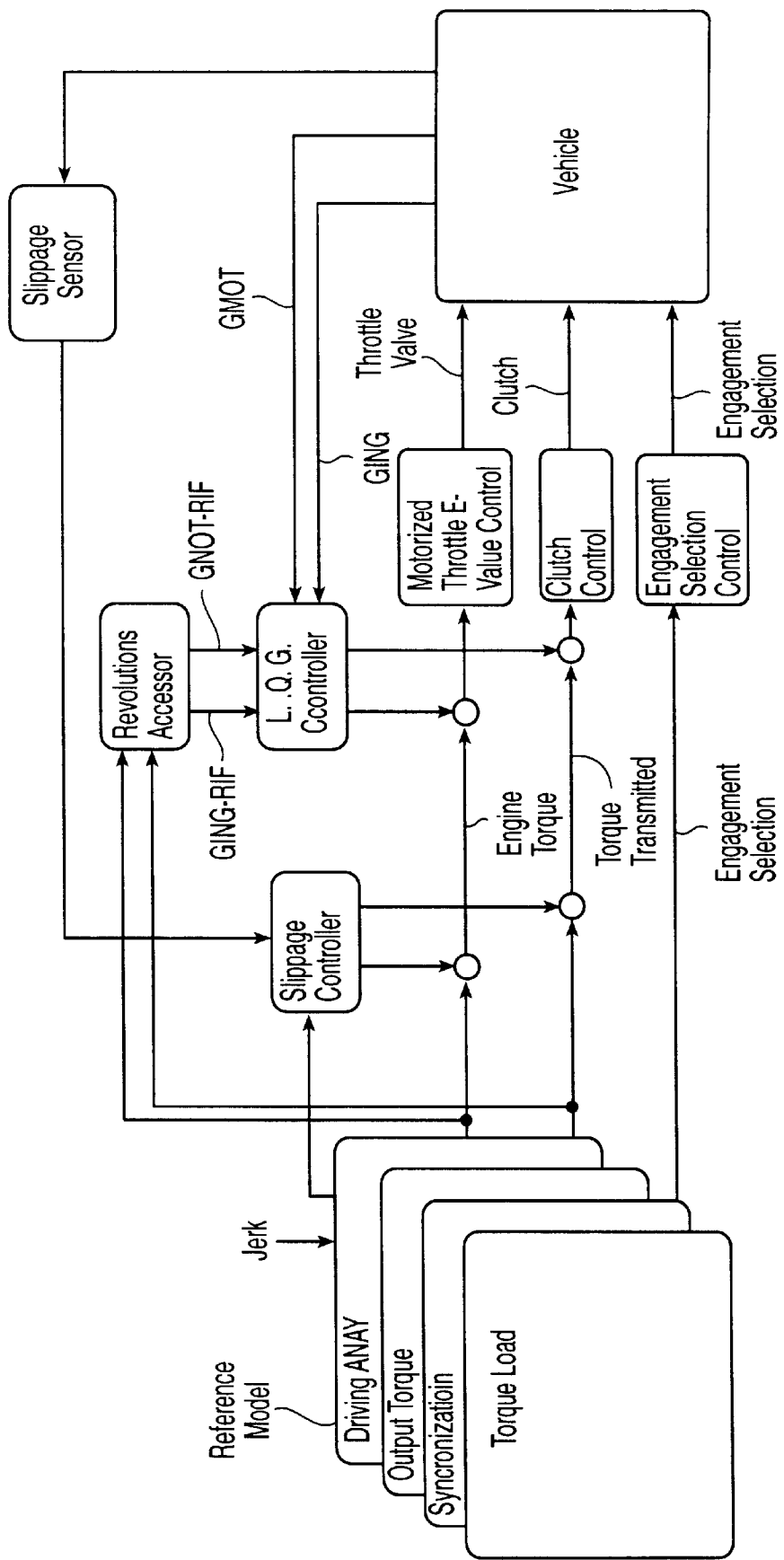
Figure 5:
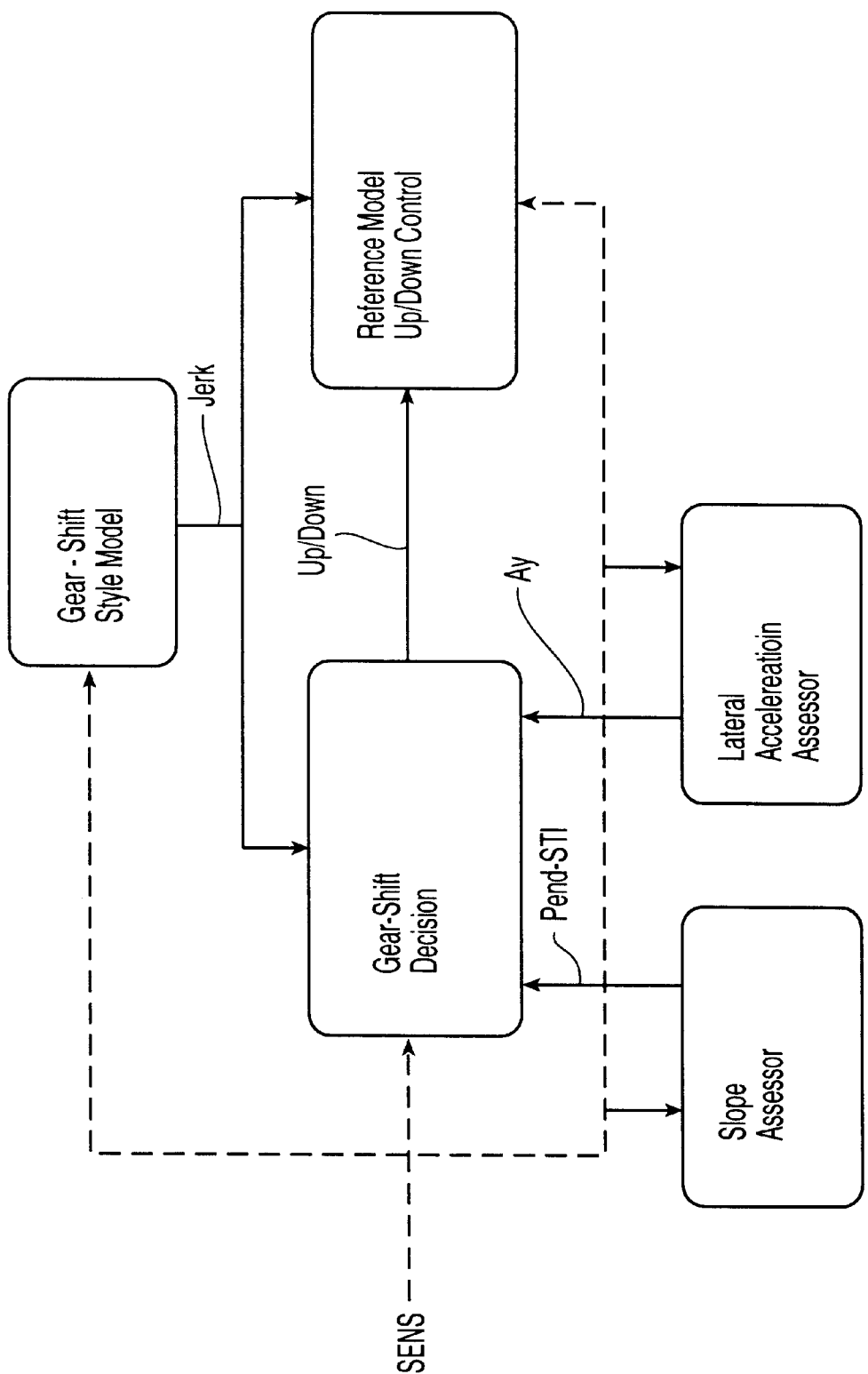
FIGS. 5, 6 and 7 are three block diagrams illustrating, by way of example, the structure and the operation of the control system implemented in the control unit ECU.
Figure 6:
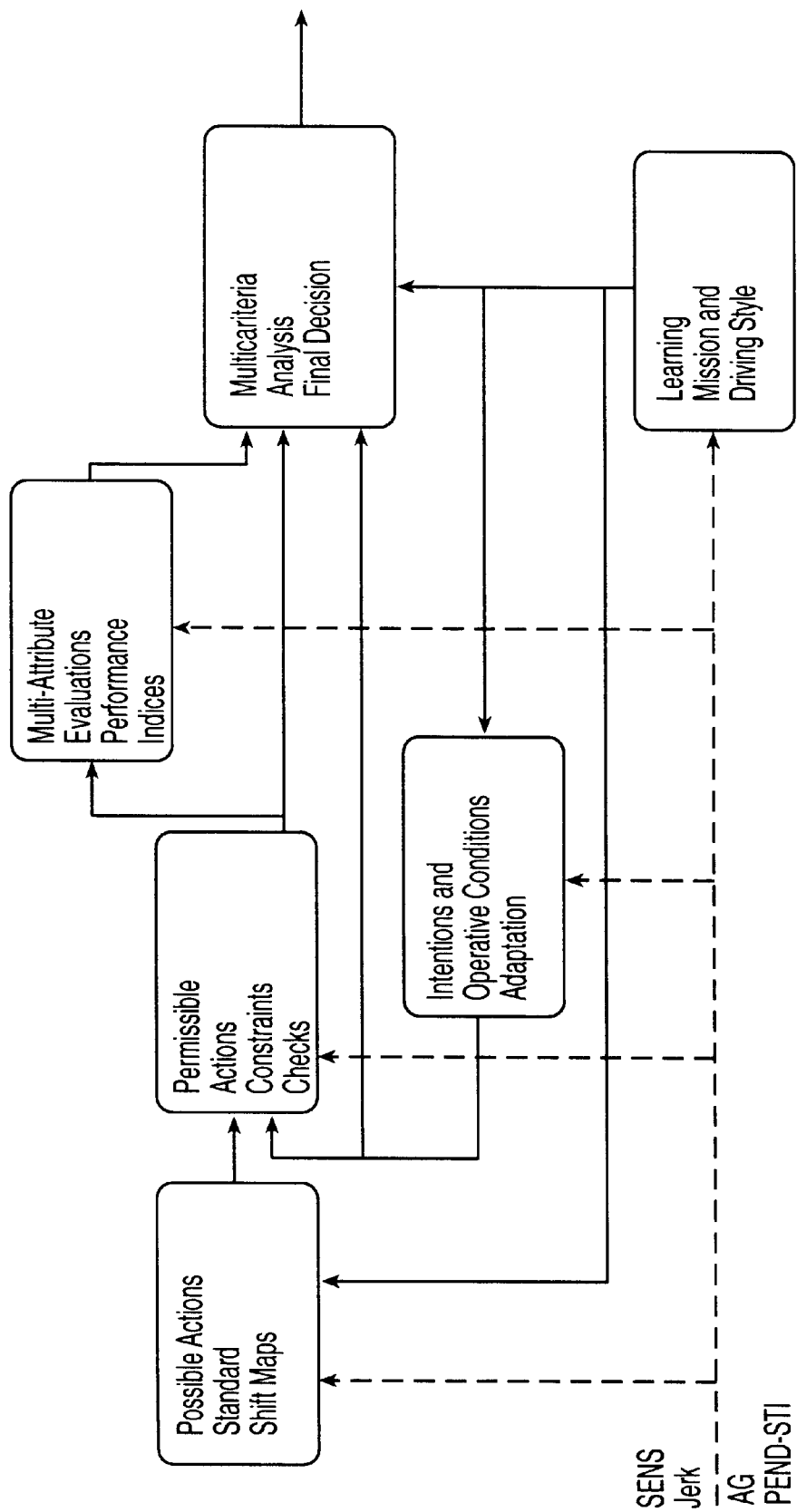
Figure 7:
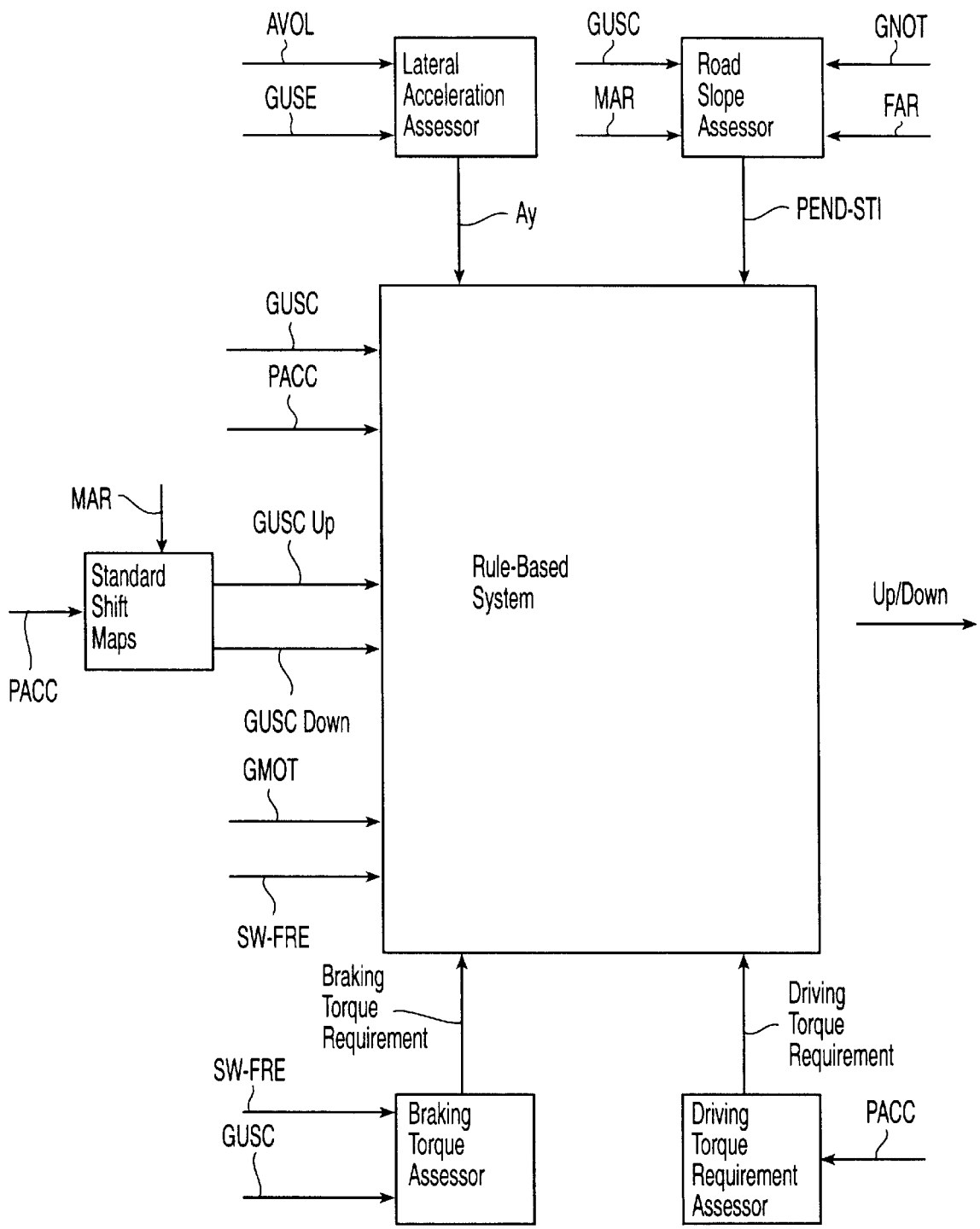
Figure 8:
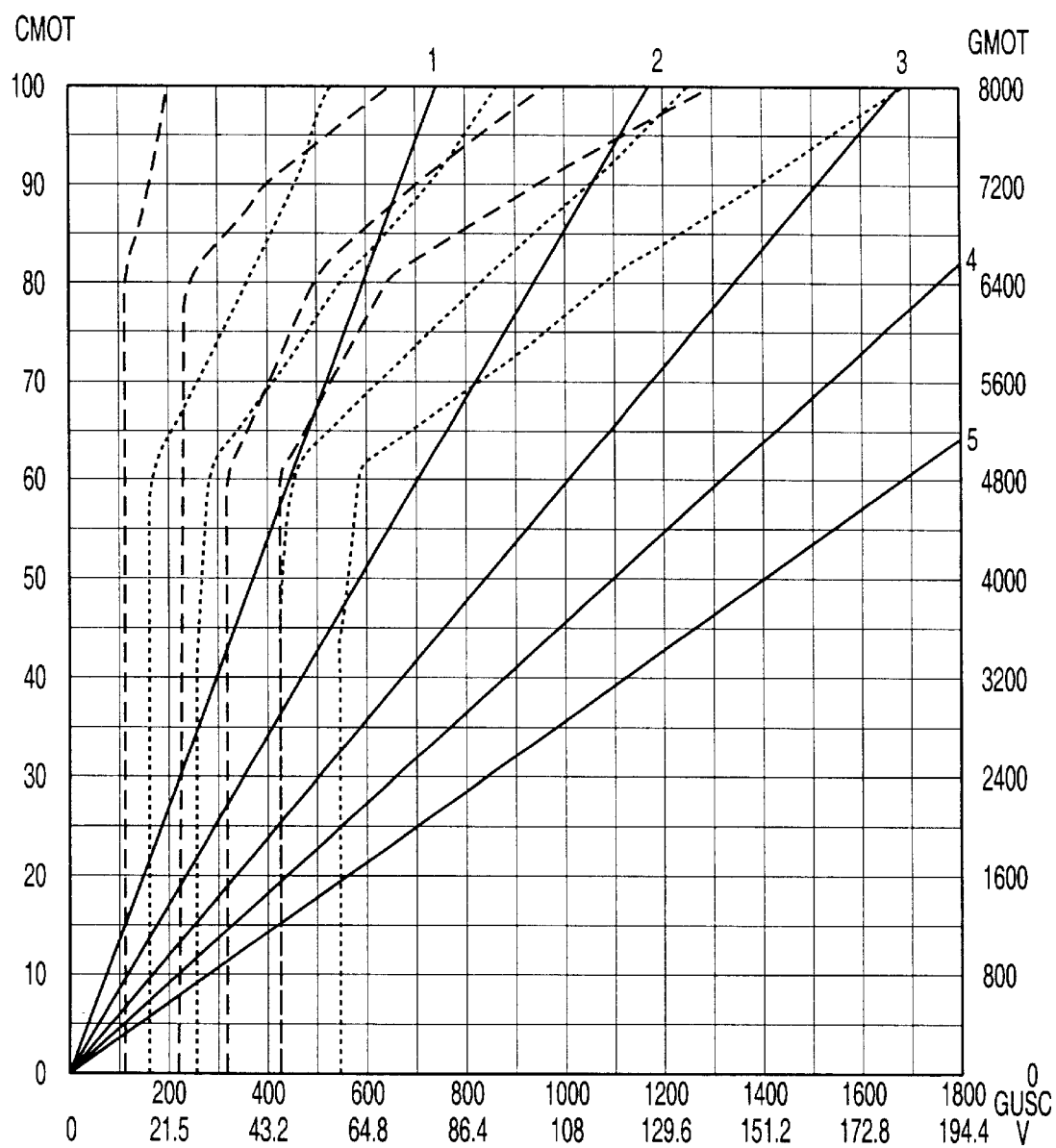
FIG. 8 shows, again by way of example, a table giving the gear-shifting conditions, for example, for a given operative mode, used in the execution of the strategies implemented in the control unit ECU.
Figure 9:
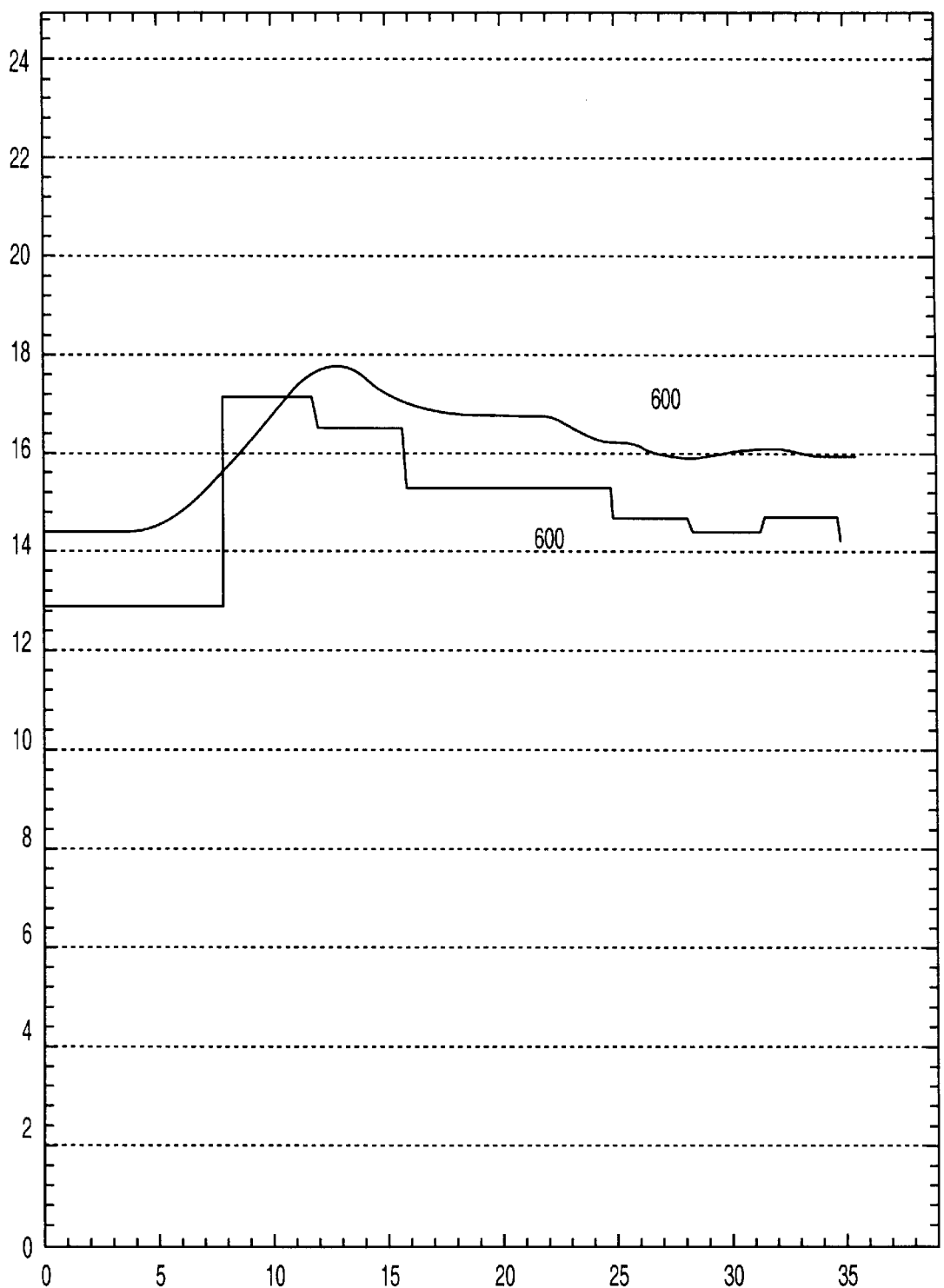
Figure 10:
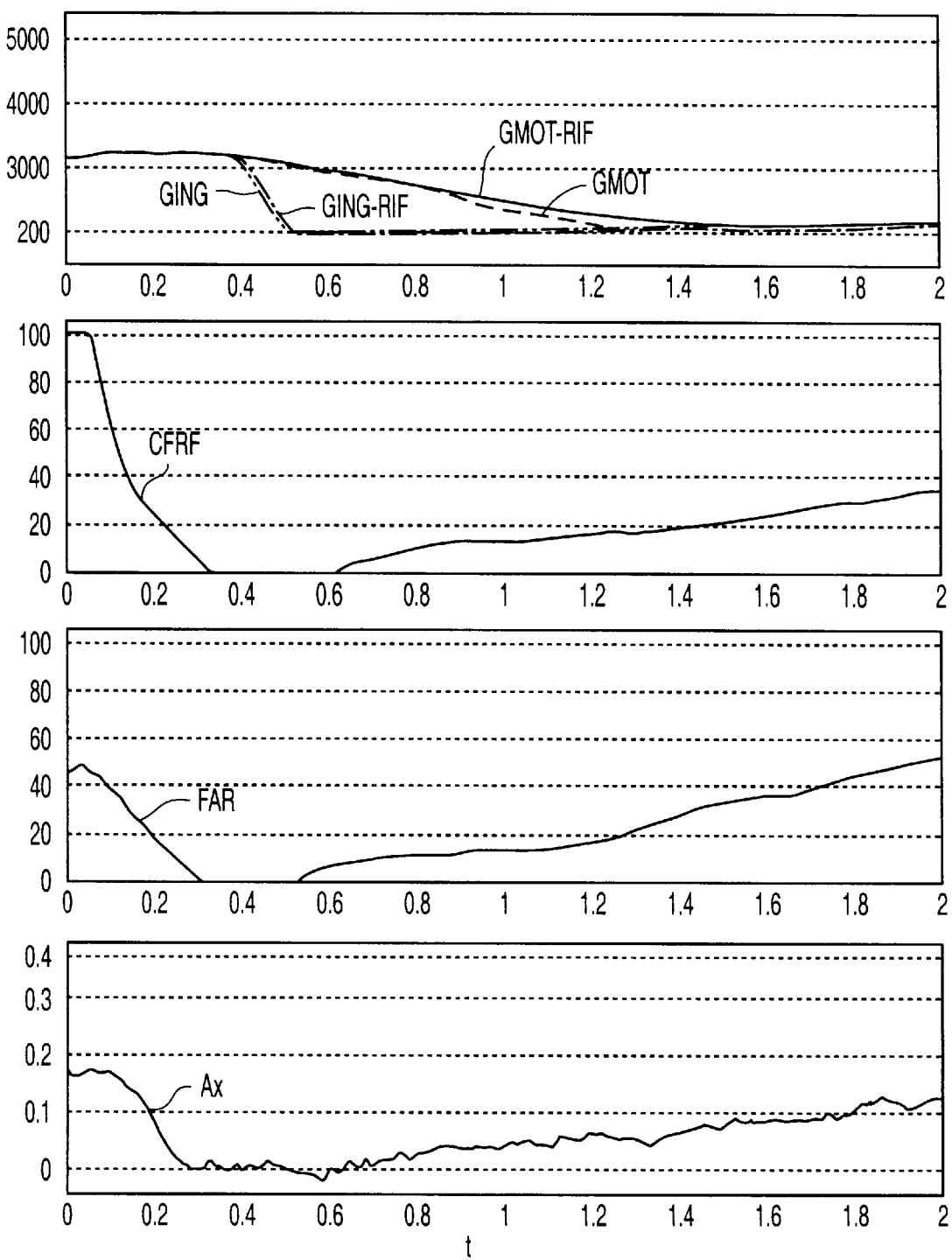
Figure 11:
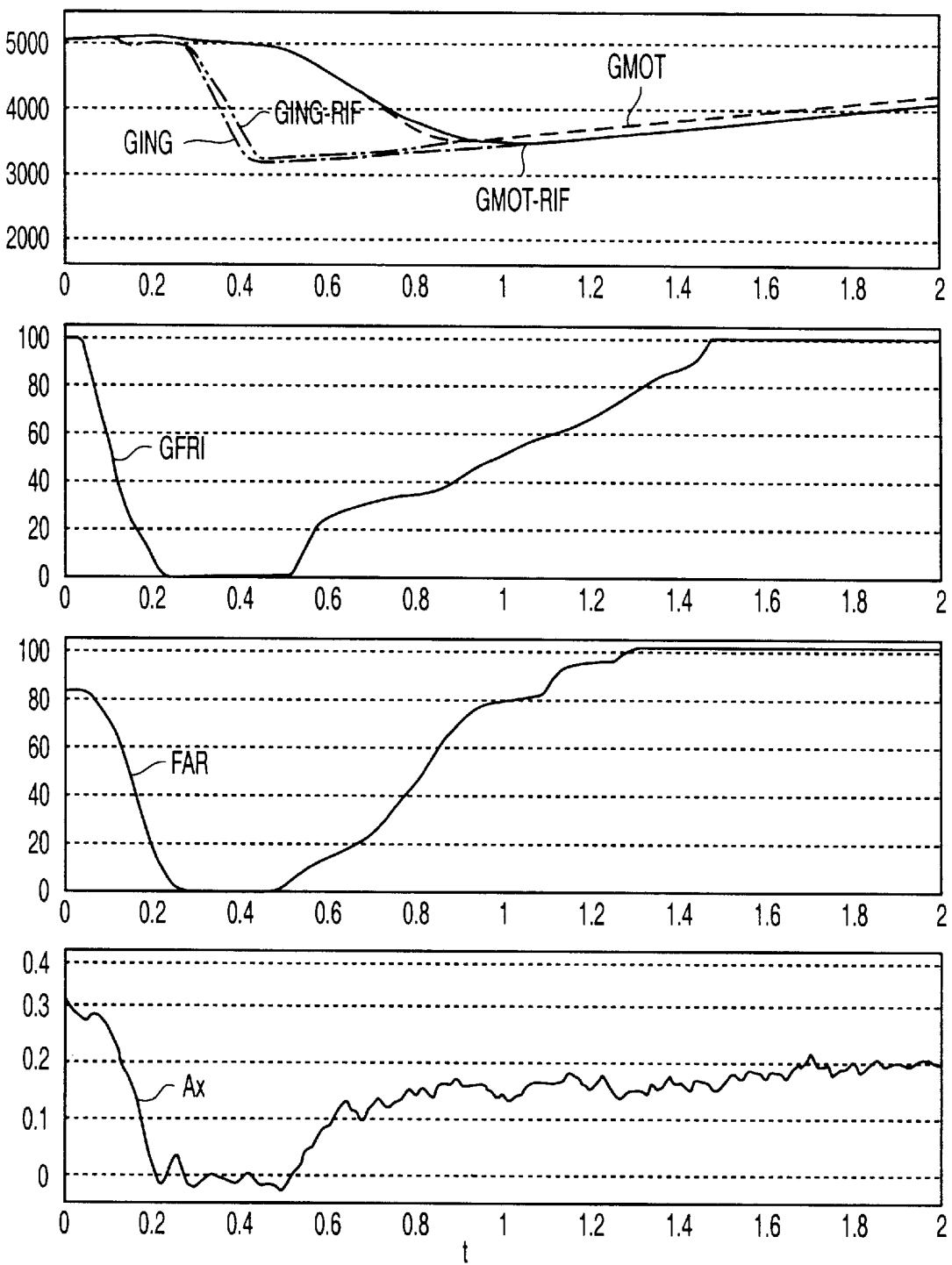
Figure 12:
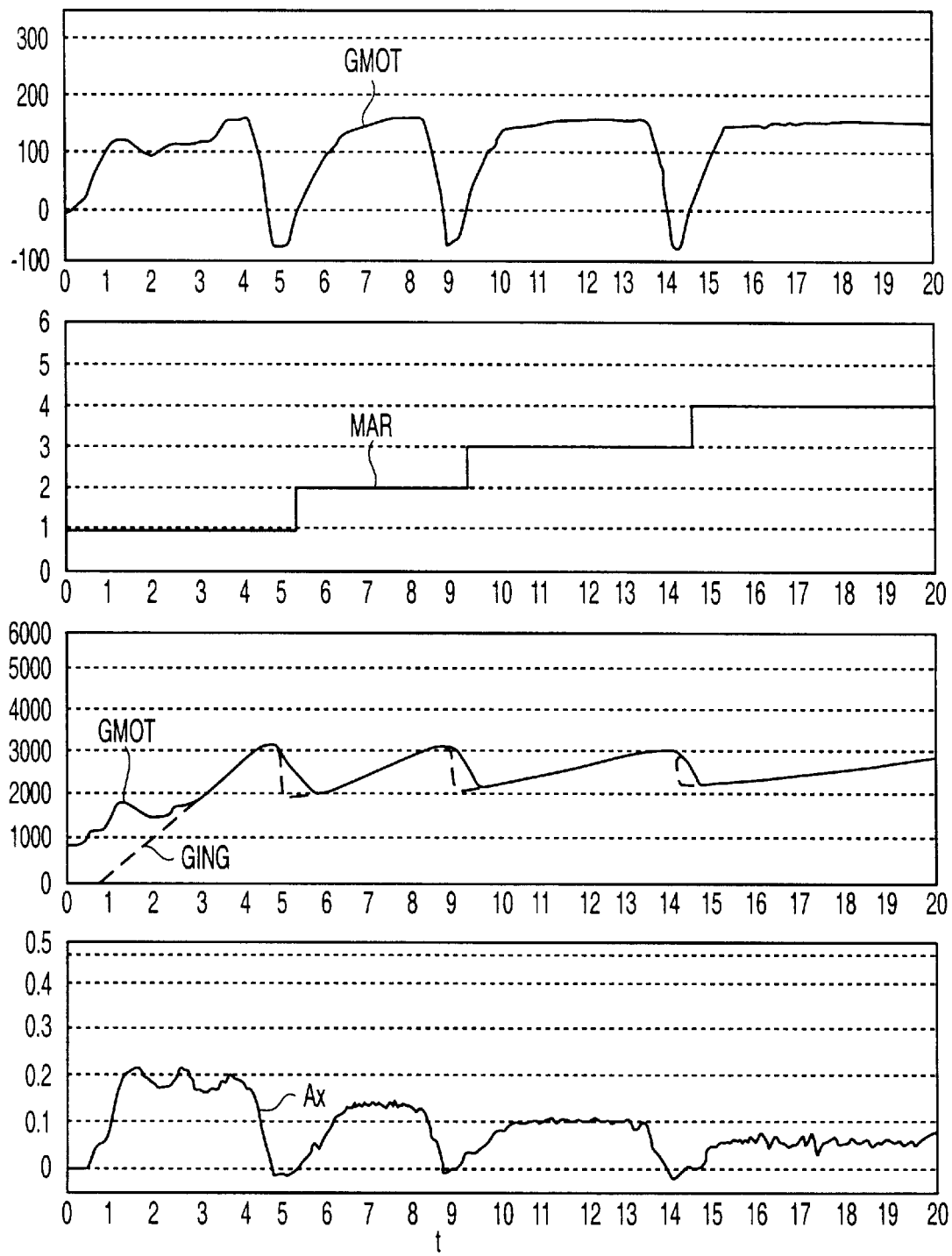
Figure 13:
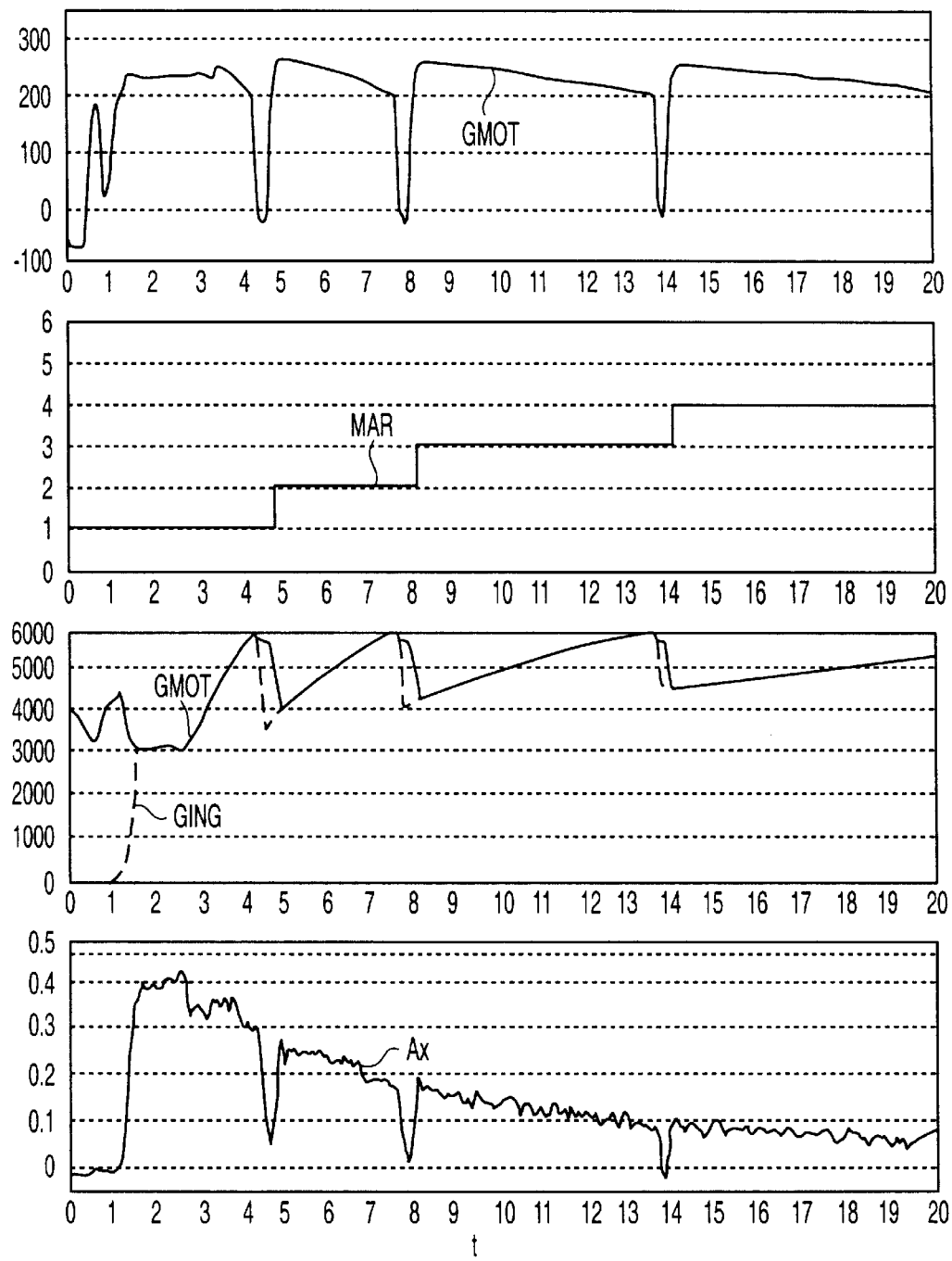
Figure 14:
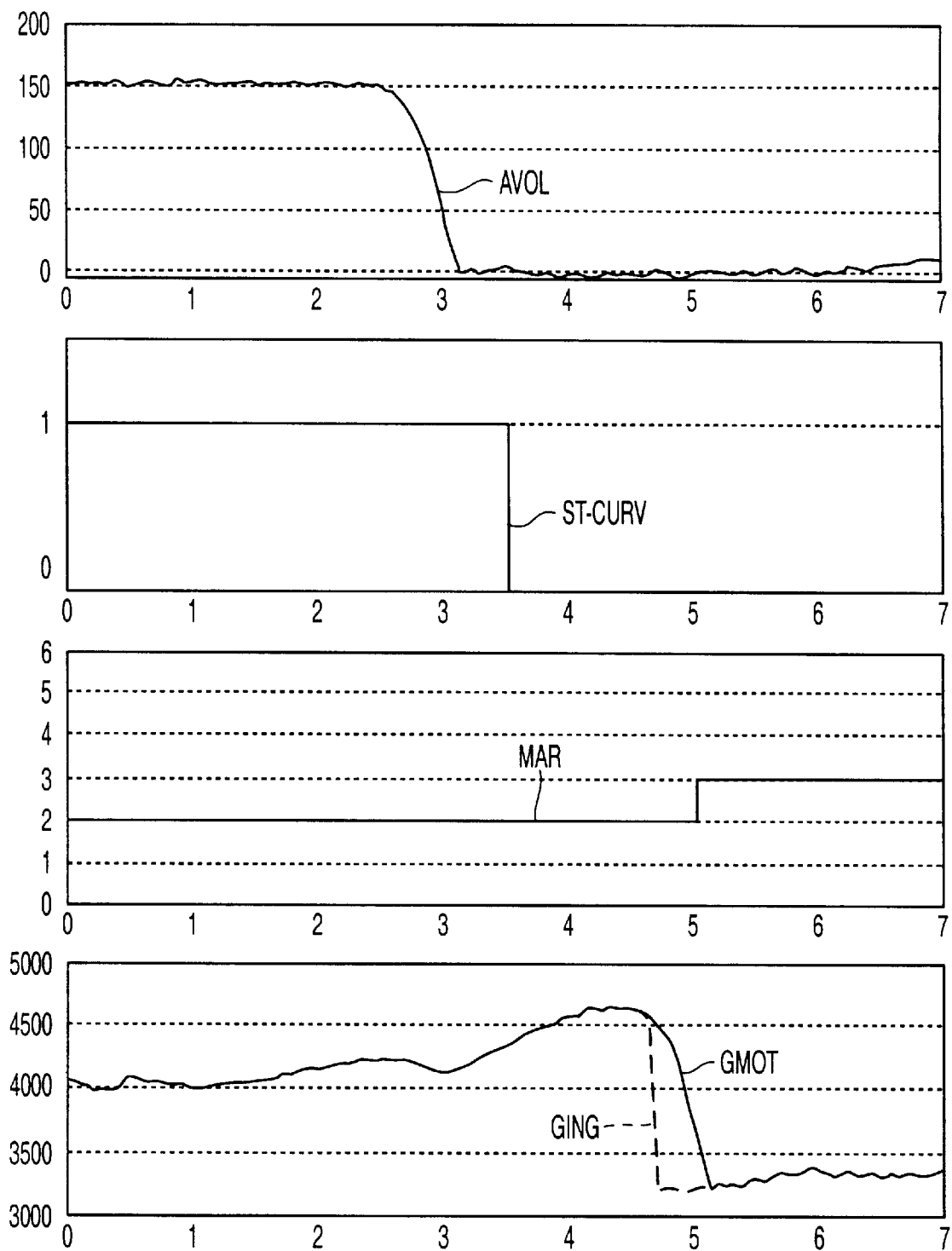
Figure 15:
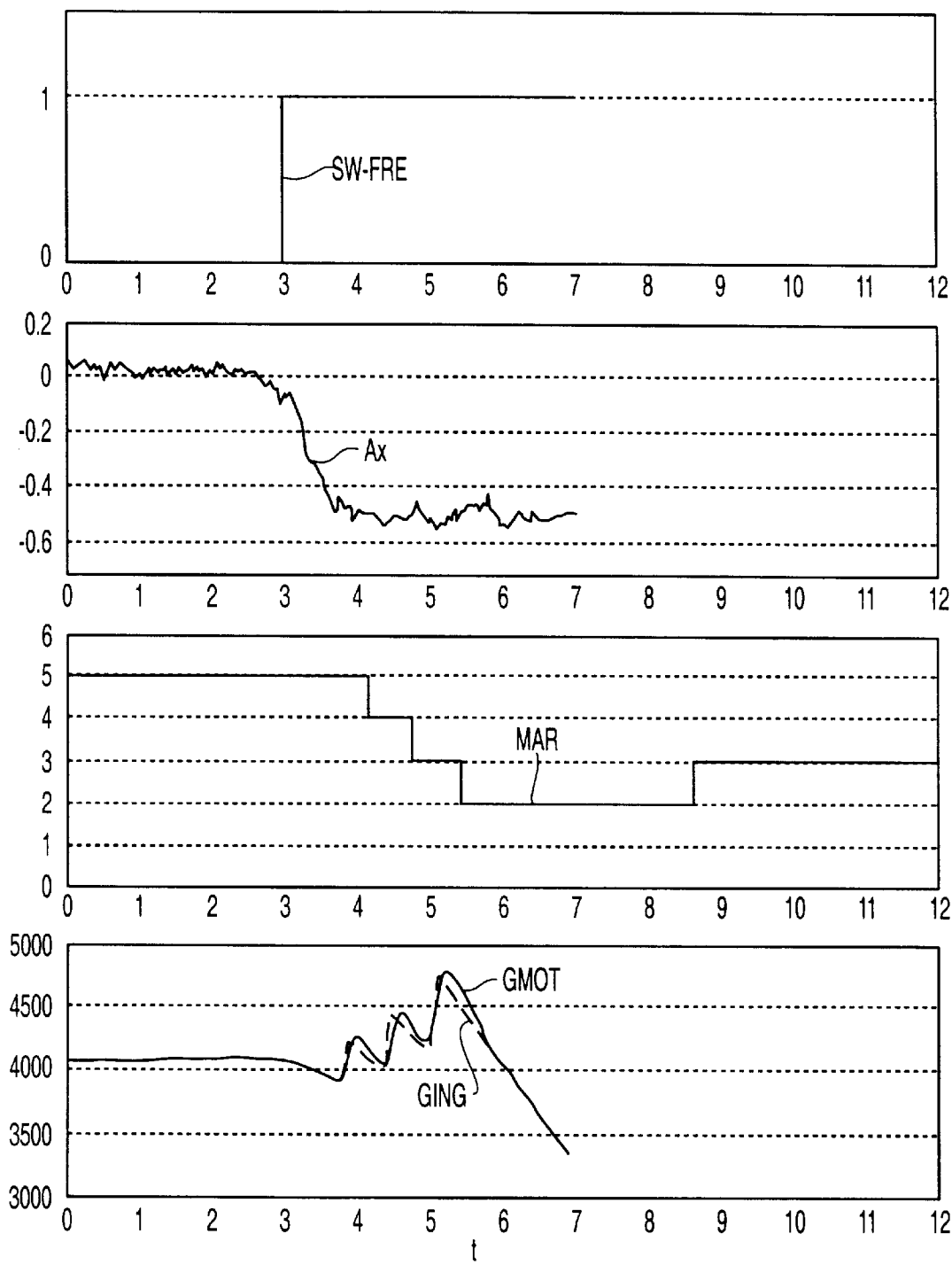
Figure 16:
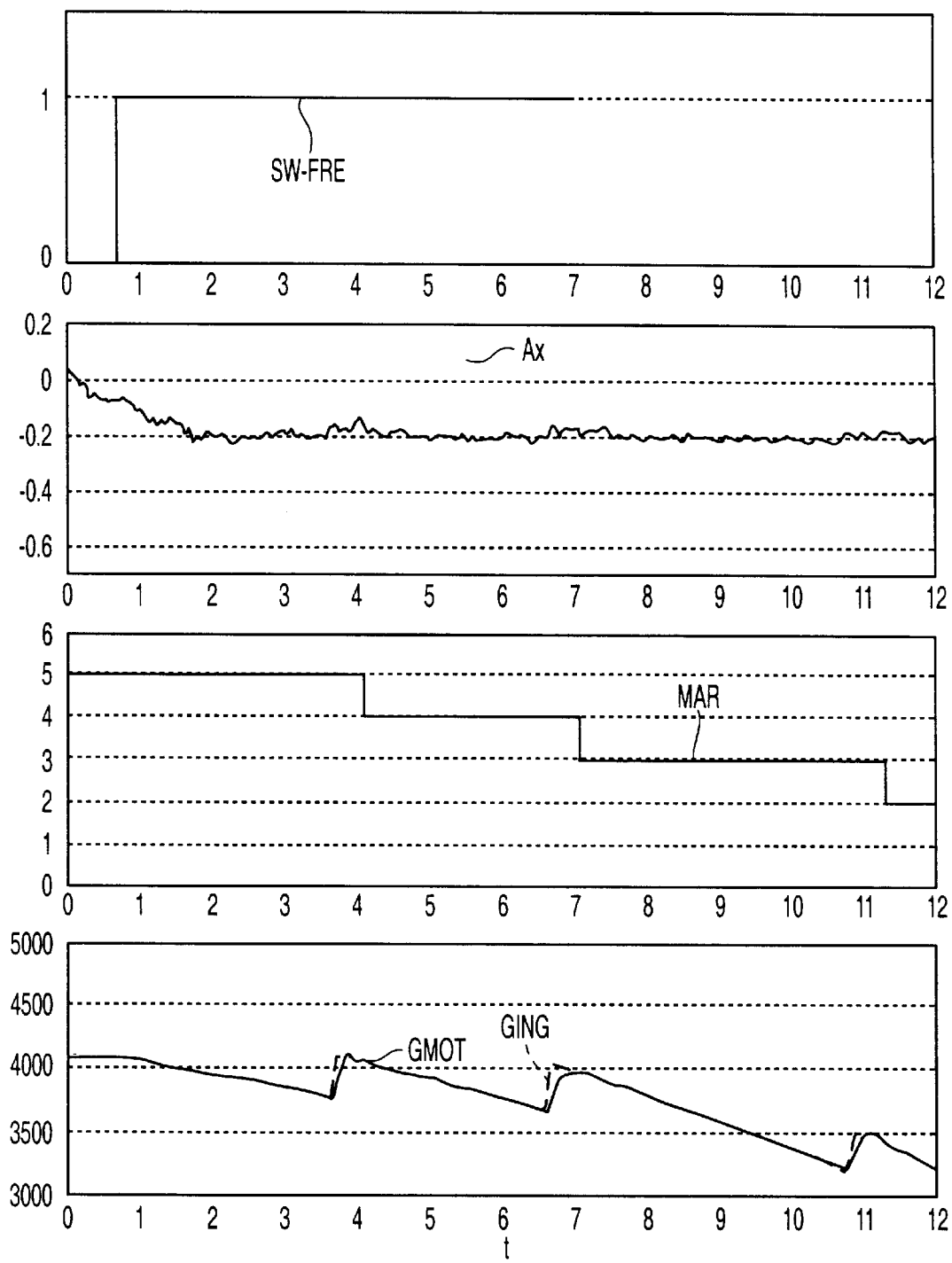
Figure 17:
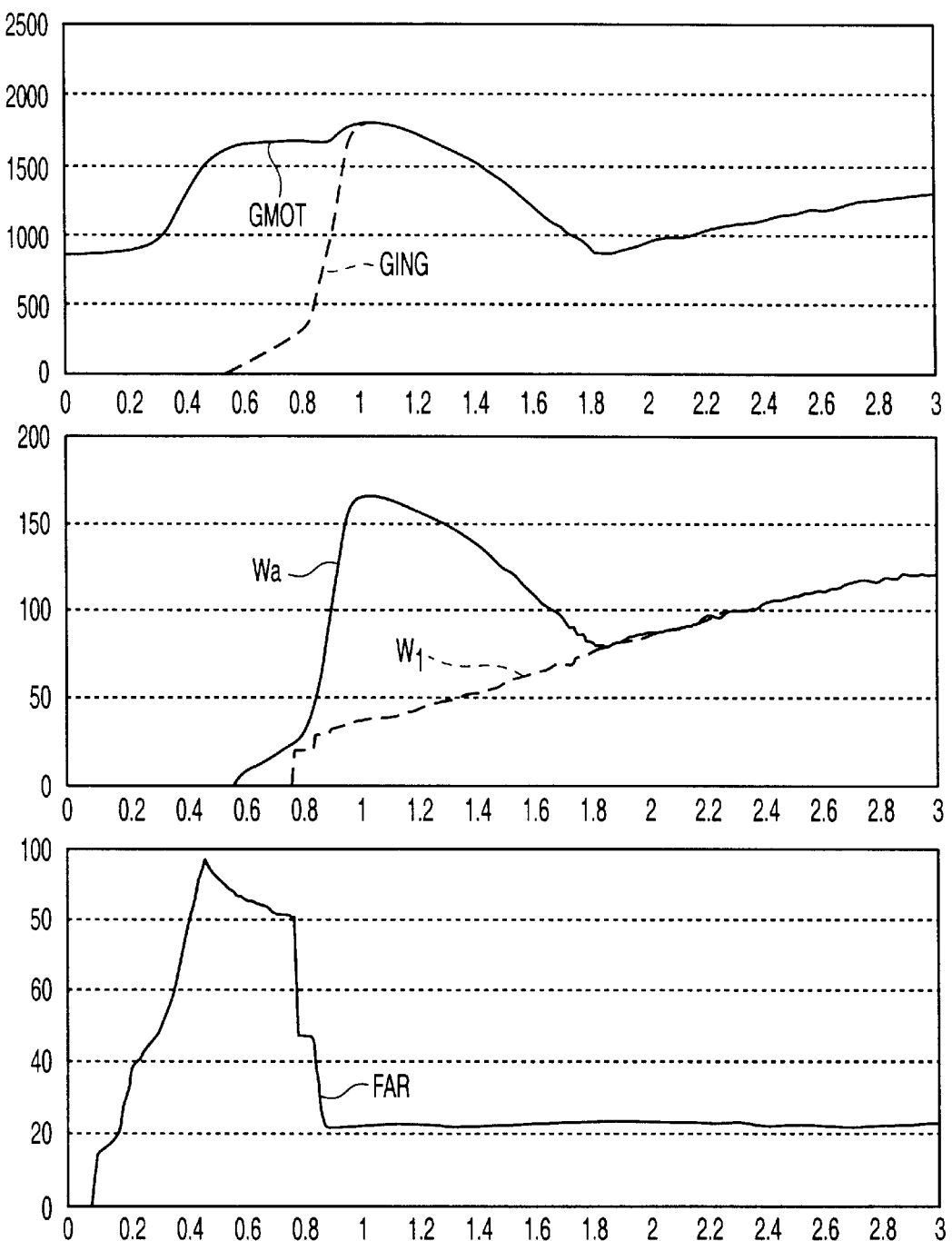

The table of FIG. 8 thus shows, by way of example, a standard shifting map, mentioned above, which is used by the control system according to the present invention. As can be seen in the map, the conditions for effecting the gear shifts are given (by means of dotted lines for the UP gear shifts, and by means of broken lines for the DOWN gear shifts) as functions of the engine torque CMOT, the engine revolutions GMOT and the output revolutions of the gear-box GUSC, or the vehicle speed V, which is equivalent thereto.

Some rules and the relative parameters and calibration methods are set out below by way of example.

Rule for Recognition of "IDLE" Statement of the Rule

If the accelerator pedal is fully released, a request for braking torque is recognized. In these conditions, an UP shift would result in a loss of the braking effect of the engine MT.

IF pacc_det<pacc_idle_stdup THEN IDLE=TRUE
ELSE IDLE=FALSE

Calibration Method

Acquisition of the accelerator pedal signal PACC in the fully released condition (pacc_min). The "IDLE" is to be considered as an accelerator pedal threshold PACC such that the engine MT can deliver a minimum driving torque.

Calibration Parameters

Pacc_min=80 bits accelerator pedal released

Pacc_idle_stdup=100 bits PACC threshold for recognition of "IDLE"

Rule for Recognition of "MAXIMUM ENGINE SPEED" Statement of the Rule

If the driver's requirements are such as to bring the engine close to the maximum engine speed limit the UP shift is enabled.

If gmot_fil$\geq$s_gmot_nodisable THEN MAX. ENGINE SPEED=TRUE
ELSE MAX. ENGINE SPEED=FALSE Calibration Method Acquire the signals of engine revolutions (gmot_fil) and of the gear required (ngear) in the following conditions of use:

semi-automatic mode, vehicle on bend (Ay>0.20 g), engine revolutions GMOT close to intervention of the rpm-limiting device of the engine MT.

The engine revolution threshold GMOT for the recognition of the "MAX_ENGINE_SPEED" condition is calibrated so as not to cause the engine rpm-limiting device to intervene.

Calibration Parameters

S_gmot_nodisable=6500 rpm. Threshold GMOT for recognition of "MAX_ENGINE_SPEED"

Rule for Recognition of "GEAR-SHIFT-IN-PROGRESS" Statement of the Rule

The system for controlling the UP/DOWN shifting mode indicates the gear-shift in progress condition to the automatic control by means of a variable or flag:

GEAR_SHIFT_IN_PROGRESS

Rule for Recognition of "CONSTANT TORQUE" Statement of the Rule

If the differential of the position PACC of the accelerator pedal PA is between the "RELEASE" threshold and an upper threshold (f(gmot)), confirmed for a minimum time period, and the accelerator pedal PA is depressed beyond the "MINIMUM" threshold, the operation is interpreted as a requirement for constant torque.

IF ((dpacc_n_steps>s_dpacc_nostdup) AND
Dpacc_n_steps<INTERP (gmot_fil,ram_dpacc_stopped) AND
(Pacc_det$\geq$pacc_idle_stdup))
for TIME INTERP (gmot_fil, ram_time_paccstopped)
THEN CONSTANT_TORQUE=TRUE
ELSE CONSTANT_TORQUE=FALSE Calibration Method The signals ngear, dpacc-n_steps, pacc_det, gmot_fil are acquired in UP/DOWN mode and in the bands of use described in the calibration of the standard shifting maps. For the gear-shift requirement, the curve of the signals of the differential of the accelerator pedal (dpacc_n_steps) correlated with the engine speed (gmot_fil) is checked. The constant-torque recognition band must be narrow at low engine speeds where the torque is very sensitive to small variations in the throttle valve, and wider at fast engine speeds, where the torque is less sensitive to variations of the throttle valve RAM_DPACC_STOPPED.

The constant torque recognition band is also confirmed for a minimum time period tabulated in dependence on the engine revolutions GMOT, RAM_TIME_PACCSTOPPED.

The confirmation period is inversely proportional to the engine speed GMOT (longer for lower speeds) so as to take account of the different response dynamics of the engine MT.

Rule for recognition of "BRAKING-ON-BEND" Statement of the Rule

The disablement of the gear shift in conditions of lateral acceleration Ay is also active for shifting DOWN, except in conditions in which braking torque is required.

IF (BEND AND
BRAKE AND
IDLE AND
dgusc_1 hz<s_dgusc_dwauto)
THEN BRAKING_ON_BEND=TRUE
ELSE BRAKING_ON_BEND=FALSE Calibration Method The calculated vehicle deceleration signal (dgusc_1 hz) is acquired in the following conditions:

semi-automatic mode (UP/DOWN)

vehicle on bend (Ay>0.2 g), accelerator pedal PA released, brake pedal PF depressed.

The threshold of dgusc_1 hz to be calibrated is the minimum significant value of the calculated deceleration signal due to an actual operation of the brake pedal PF corresponding to about 0.1 g.

Calibration Parameters s_dgusc_dwauto=30 (0.1 g) deceleration threshold for recognition of "BRAKING_ON_BEND"

Rule for Recognition of "MAX-ENGINE-SPEED-DOWN"

Statement of the Rule

In braking conditions, it is checked that the gear decrease is permissible, that is, that the target engine revolutions of the new ratio are below the maximum revolutions threshold tabulated as a function of the gear.

The downward gear shift is permitted if the following rule is confirmed:

IF (_gincobø(ngear−1)<ram_gmot_max[ngear−1] AND BRAKING)

THEN MAX_ENGINE_SPEED_DOWN=TRUE

ELSE MAX_ENGINE_SPEED_DOWN=FALSE

Calibration Method

The values inserted in the table RAM_GMOT_MAX have to permit engagement of 2nd, 3rd and 4th gears up to the value at which the engine rpm-limiting device intervenes (about 7000 rpm).

For first gear, the value tabulated is lower in order to prevent excessive work of the synchronizing gear which could compromise its life.

Calibration Parameters

RAM_GMOT_MAX

| TABLE OF MAXIMUM ENGINE REVOLUTIONS FOR ACCEPTANCE OF GEAR | | | | |
|---|---|---|---|---|
| GEAR | FIRST | SECOND | THIRD | FOURTH |
| GMOT_MAX | 4500 | 7000 | 7000 | 7000 |

Braking-torque Requirement Assessor

For correct automatic control of the gear-shift during braking it is important to analyze the dynamic behaviour and to recognize the type of braking in order to ensure a response consistent with the driver's requirements.

The algorithm for assessing the deceleration required during braking is based on three contributory factors:

the contributory factor due to the calculated deceleration of the vehicle, the contributory factor due to the operation of the brake pedal PF, the contributory factor due to the actual decrease in engine revolutions GMOT.

The assessor enables the following principal situations to be recognized by means of the foregoing contributory factors:

light operation of the brake pedal in the vicinity of to a bend, medium braking carried out to adapt speed to road traffic requirements, emergency braking (large decelerations in very short times).

It should be noted that the assessment algorithm is activated only when the brake pedal PF is depressed.

Conditions for Activation of the Assessment Algorithm and its Initial Conditions

```
IF  (BRAKING)
{   braking-torque-requirement ( ) }
ELSE
{
    Δaging_dec_veic = ø;   // reset contributory factors
    Δaging_sw_break = ø;
    Δaging_actual = ø;
    Δagingø_brake = ø      // initializes input revolutions at
                              the initial value
    _intbreak = ø          // reset contributory factor of
                              brake-pedal function
```

Contributory Factor due to the Calculated Deceleration of the Vehicle

This assessment calculates the contributory factor Δaging_dec_veic" which represents the target delta engine revolutions, in dependence on the calculated deceleration of the vehicle.

This contributory factor enables the engine to be kept at a rate of revolution which ensures a significant braking torque.

Algorithm:

Δaging_dec_veic=INTERP (dec_engine, & ram_cor_dgusc) dec_engine=dec_veic*tau [gear]

IF (dgusc_1 Hz>0)

Dec_veic=0

ELSE dec_veic=-dgusc_1 Hz;

Contributory Factor Depending on Brake Pedal Operation

This assessment serves to ensure a minimum engine braking contribution owing solely to the intervention of the brake switch SW-FRE.

The assessment calculates the contributory factor "Δaging_sw_brake" which takes account of the gear engaged and of the minimum deceleration of the vehicle without operation of the brake pedal PF.

Algorithm:

Integrator

_intbrake+=ram_kt_dec[gear]/1000*tau[gear]*(-dgusc_min);

integrator saturation

IF (_intbrake≧-int-brake-lim)

_intbrake=_int_brake_lim;

The value Δaging_sw_brake is saturated at the value:

Δaging_sw_brake=_intbrake;

deltaging=ram_gmot_dw[gear]−_gincobø[gear]);

IF (delta_ging<ø)

{

Δaging_sw_brake=ø;

{

ELSE

{

IF (Δaging_sw_brake>Δaging) Δaging_sw_brake=delta_ging;

Contributory Factor Due to the Actual Decrease in Engine Revolutions

This assessment calculates the contributory factor "Δaging_actual" which is proportional to the actual decrease in engine revolutions GMOT resulting from the operation of the brake pedal PF.

The intervention of this contributory factor is active only for fast vehicle speeds V.

Algorithm
```
IF (ging_fil≧gingø_brake)
{
    Δging_actual=ø
}
ELSE
{
    Δging_actual=(gingø_brake_ging_fil)
    *INTERP (gusc_2 hz, & ram_gusc_dw)/1000;
}
```
It should be noted that gingø_brake is set at the value of ging_fil when the brake pedal PF is not depressed and during transitory gear-shift conditions (GEAR_SHIFT_IN_PROGRESS).

Naturally, the principle of the invention remaining the same, the details of construction and forms of embodiment may be varied widely with respect to those described and illustrated, without thereby departing from the scope of the present invention.

What is claimed is:

1. A system for controlling a servo-controlled gearbox (C) fitted in a motor vehicle, comprising:
   processing means (ECU),
   sensor means (SENS) operatively connected to the processing means (ECU) for detecting a plurality of physical quantities relating to the operation of the vehicle, and
   actuator means (AT) operatively connected to the processing means (ECU) for controlling the operation of the servo-controlled gearbox (C);
   the system being configured so as to detect a plurality of operative conditions of use of the vehicle and to implement different strategies for the control of the servo-controlled gearbox (C) in dependence on the operative conditions of use detected;
   the processing means (ECU) including reference model means for determining open-loop command signals for said actuator means (AT) on the basis of a predetermined mathematical driving model which sets the behaviour of the vehicle in accordance with a designated profile of the longitudinal acceleration (Ax) of the vehicle, said processing means (ECU) being predisposed for adding to said open-loop command signals closed-loop contribution signals generated by a Linear-Quadratic-Gaussian controller.

2. A system according to claim 1, characterised in that the processing means (ECU) are configured to detect a plurality of operative conditions selected from the group constituted by:
   movement at constant speed,
   normal acceleration,
   rapid acceleration,
   normal deceleration,
   rapid deceleration,
   road slope,
   movement in a straight line,
   movement on a bend,
   starting from a standstill,
   slippage of the driving wheels (WH).

3. A system according to claim 1, characterized in that the processing means (ECU) are configured to operate selectively in one of the following two modes:
   a semi-automatic mode, in which the gear shifts are decided by the driver of the vehicle and communicated to the processing means (ECU) by means of a control device (LC),
   an automatic mode, in which the gear shifts are decided by the processing means (ECU).

4. A system according to claim 3, characterized in that the processing means (ECU) are configured to operate, in the automatic mode, selectively:
   in a first comfort-priority mode, in which the processing means RECU) execute the gear shifts in a manner such as to minimize the variations (jerks) in the longitudinal acceleration (Ax) of the vehicle,
   in a second performance-priority mode, in which the processing means (ECU) execute the gear shifts in a manner such as to maximize the longitudinal acceleration (Ax) of the vehicle.

5. A system according to claim 1, characterized in that the processing means (ECU) are configured to detect the operative conditions on the basis of a plurality of signals indicative of the physical quantities detected by the sensor means (SENS), selected from the group constituted by:
   operation (PACC) of the accelerator pedal (PA),
   operation (SW-FRE) of the brake pedal (PF),
   steering-wheel angle (AVOL),
   engine revolutions (GMOT),
   gearbox input revolutions (GING),
   gearbox output revolutions (GUSC),
   driving wheel revolutions ($\omega$a),
   non-driving wheel revolutions ($\omega$p),
   throttle-valve position (FAR),
   clutch position,
   mode set by the user.

6. A system according to claim 5, characterized in that the processing means (ECU) are configured for modulating the torque (CMOT) delivered by the engine (MT) and the position of the clutch, in an operative condition in which the vehicle is starting from a standstill, so as to minimize slippage of the driving wheels (WH), detected by the sensor means (SENS), and to achieve a longitudinal acceleration (Ax) of the vehicle corresponding to the operation of the accelerator pedal (PA) by the driver.

7. A system according to claim 3, characterized in that, in the automatic mode, the processing means (ECU) are configured to execute the gear shifts on the basis of predetermined stored data defining gear-shifting conditions.

8. A system according to claim 7, characterized in that the predetermined stored data comprise at least one gear-shifting map defining the gear-shifting conditions in dependence on:
   engine revolutions (GMOT),
   engine torque (CMOT),
   gearbox output revolutions (GUSC).

9. A system according to claim 7, characterized in that the processing means (ECU) are configured to ignore the predetermined stored data in dependence on the operative conditions of the vehicle.

10. A system according to claim 9, characterized in that the processing means (ECU) are configured to ignore the predetermined stored data on the basis of a system of rules defining predetermined combinations of the operative conditions of the vehicle such as to require the predetermined stored data to be ignored.

11. A system according to claim 7, characterized in that the predetermined stored data are derived on the basis of the experimental measurements relating to gear shifts carried out in manual mode by human drivers.

12. A system according to any one of claim 9 to 11, characterised in that the processing means (ECU) are configured to ignore the predetermined stored data in dependence on at least one of the operative conditions of the vehicle, selected from the group constituted by:
- deceleration,
- steep road slope,
- driving round a bend,
- slippage of the driving wheels (WH), in order not to have an adverse effect on the drivability of the vehicle.

13. A method of controlling a servo-controlled gearbox (C) fitted in a motor-vehicle, comprising the steps of:
- detecting a plurality of operative conditions of use of the vehicle,
- controlling the operation of the servo-controlled gearbox (C) through actuator means (AT) in dependence on the operative conditions of use detected, using a reference model for determining open-loop command signals for said actuator means (AT) on the basis of a predetermined mathematical driving model which sets the behaviour of the vehicle in accordance with a designated profile of the longitudinal acceleration (Ax) of the vehicle, closed-loop contribution signals generated by a Linear-Quadratic-Gaussian controller being added to said open-loop command signals.

* * * * *